(12) United States Patent
Di Stefano et al.

(10) Patent No.: US 8,025,097 B2
(45) Date of Patent: Sep. 27, 2011

(54) METHOD AND APPARATUS FOR SETTING AND CONTROLLING TEMPERATURE

(75) Inventors: Peter T. Di Stefano, San Jose, CA (US); Thomas H. Di Stefano, Monte Sereno, CA (US)

(73) Assignee: Centipede Systems, Inc., San Jose, CA (US)

( * ) Notice: Subject to any disclaimer, the term of this patent is extended or adjusted under 35 U.S.C. 154(b) by 1129 days.

(21) Appl. No.: 11/598,989

(22) Filed: Nov. 14, 2006

(65) Prior Publication Data

US 2007/0267188 A1 Nov. 22, 2007

Related U.S. Application Data

(60) Provisional application No. 60/801,302, filed on May 18, 2006.

(51) Int. Cl.
*F28F 27/00* (2006.01)
*F28F 27/02* (2006.01)
*G05D 23/00* (2006.01)
*G05D 23/12* (2006.01)
*F25D 17/02* (2006.01)
*H02B 1/00* (2006.01)

(52) U.S. Cl. .......... 165/276; 165/96; 165/100; 165/101; 236/50; 236/1 C; 62/185; 62/200; 62/201; 361/677

(58) Field of Classification Search ............... 236/91 D, 236/1 C, 50, 12.1; 62/185, 201, 196.1, 200; 361/676, 677; 324/760; 165/80.4, 276, 96, 165/97, 100, 101
See application file for complete search history.

(56) References Cited

U.S. PATENT DOCUMENTS

| | | | | |
|---|---|---|---|---|
| 4,820,976 A | * | 4/1989 | Brown | 324/750.08 |
| 4,831,835 A | * | 5/1989 | Beehler et al. | 62/196.1 |
| 4,945,980 A | | 8/1990 | Umezawa | 165/101 |
| 4,975,766 A | | 12/1990 | Umezawa | 357/81 |
| 5,406,212 A | | 4/1995 | Hashinaga et al. | 324/760 |
| 5,977,785 A | | 11/1999 | Burward-Hoy | 324/760 |
| 6,023,934 A | | 2/2000 | Gold | 62/51.1 |
| 6,163,161 A | | 12/2000 | Neeb | 324/760 |
| 6,184,504 B1 | | 2/2001 | Cardella | 219/513 |
| 6,239,602 B1 | | 5/2001 | Nakagomi et al. | 324/760 |
| 6,262,584 B1 | | 7/2001 | Kurosu et al. | 324/760 |
| 6,288,371 B1 | | 9/2001 | Hamilton et al. | 219/530 |

(Continued)

*Primary Examiner* — Ljiljana Ciric
*Assistant Examiner* — Travis Ruby
(74) *Attorney, Agent, or Firm* — Michael B. Einschlag

(57) ABSTRACT

One embodiment of the present invention is a method for setting and controlling temperature of a device that includes: (a) thermally contacting the device to a heat transfer apparatus, the heat transfer apparatus having an apparatus intake to receive thermal transfer fluid, an apparatus exhaust to output thermal transfer fluid, and a conduit to conduct thermal transfer fluid from the apparatus intake to the apparatus exhaust through the heat transfer apparatus; (b) flowing a first thermal transfer fluid in a first thermal control circuit at a first temperature, and flowing a second thermal transfer fluid in a second thermal control circuit at a second temperature; (c) at a first predetermined time, directing the first thermal transfer fluid to flow to the apparatus intake, and from the apparatus exhaust back to the first thermal control circuit and the second thermal transfer fluid to flow in the second thermal control circuit without flowing to the apparatus intake; and (d) at a second predetermined time, directing the second thermal transfer fluid to flow to the apparatus intake, and from the apparatus exhaust back to the second thermal control circuit and the first thermal transfer fluid to flow in the first thermal control circuit without flowing to the apparatus intake.

17 Claims, 7 Drawing Sheets

U.S. PATENT DOCUMENTS

| | | | |
|---|---|---|---|
| 6,362,944 B1 * | 3/2002 | Tustaniwskyj et al. | 361/103 |
| 6,389,225 B1 | 5/2002 | Malinoski et al. | 392/479 |
| 6,476,627 B1 | 11/2002 | Pelissier et al. | 324/760 |
| 6,489,793 B2 | 12/2002 | Jones et al. | 324/760 |
| 6,498,899 B2 | 12/2002 | Malinoski et al. | 392/479 |
| 6,549,026 B1 | 4/2003 | DiBattista et al. | 324/760 |
| 6,593,761 B1 | 7/2003 | Fukasawa et al. | 324/754 |
| 6,617,868 B1 | 9/2003 | Needham | 324/760 |
| 6,636,062 B2 | 10/2003 | Gaasch et al. | 324/760 |
| 6,771,086 B2 | 8/2004 | Lutz et al. | 324/760 |
| 6,825,681 B2 | 11/2004 | Feder et al. | 324/760 |
| 6,862,405 B2 | 3/2005 | Malinoski et al. | 392/479 |
| 6,886,976 B2 | 5/2005 | Gaasch et al. | 374/5 |
| 6,985,000 B2 | 1/2006 | Feder et al. | 324/760 |
| 6,986,382 B2 | 1/2006 | Upadhya et al. | 165/80.4 |
| 6,993,922 B2 | 2/2006 | Wall et al. | 62/223 |
| 7,004,243 B1 | 2/2006 | Babcock et al. | 165/185 |
| 7,017,358 B2 | 3/2006 | Wayburn et al. | 62/115 |
| 7,021,369 B2 | 4/2006 | Werner et al. | 165/104.33 |
| 7,023,229 B2 | 4/2006 | Maesaki et al. | 324/760 |
| 2002/0033391 A1 | 3/2002 | Malinoski et al. | 219/494 |
| 2003/0047305 A1 | 3/2003 | Malinoski et al. | 165/201 |
| 2003/0113106 A1 | 6/2003 | Hwang et al. | 392/416 |
| 2003/0155939 A1 | 8/2003 | Lutz et al. | 324/760 |
| 2004/0012404 A1 | 1/2004 | Feder et al. | 324/760 |
| 2004/0232933 A1 | 11/2004 | Maesaki et al. | 324/760 |
| 2005/0151553 A1 | 7/2005 | Kabbani et al. | 324/760 |

* cited by examiner

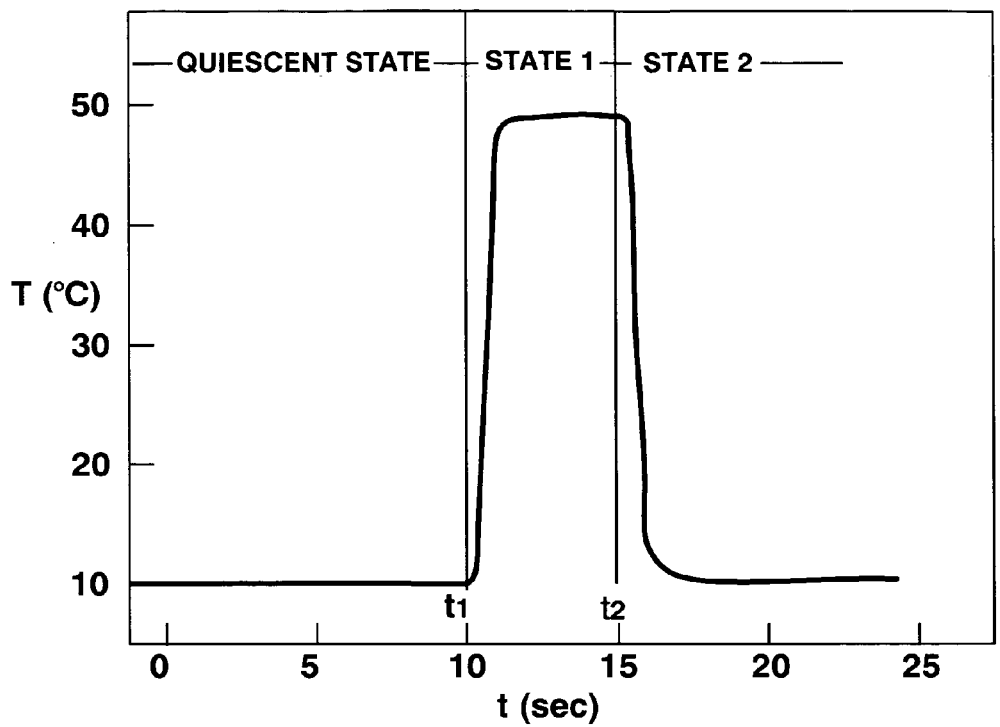
Fig. 2A
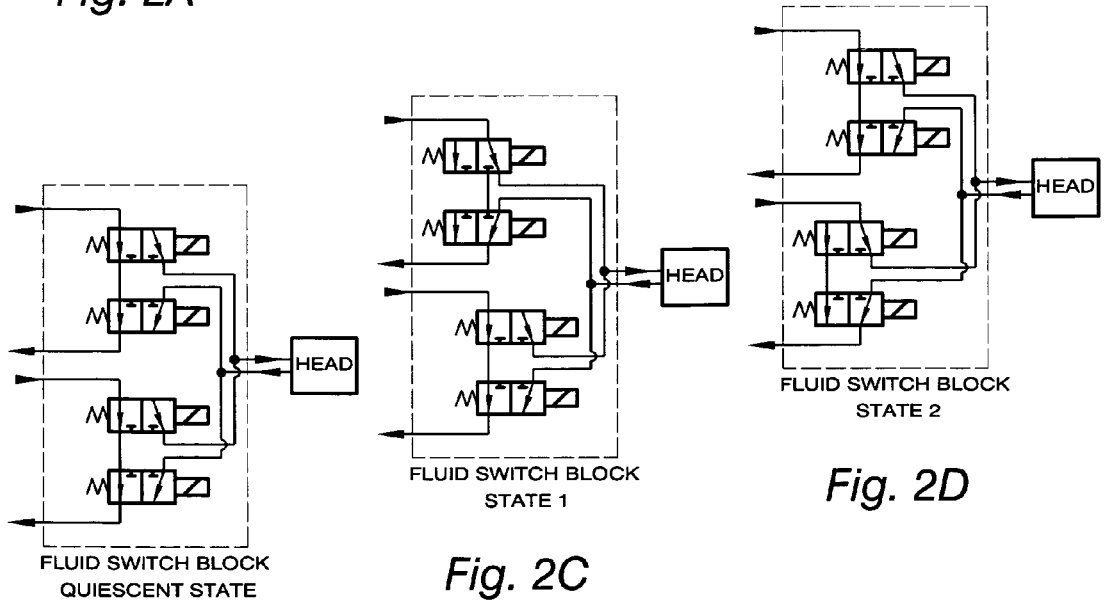
Fig. 2B
Fig. 2C
Fig. 2D

METHOD AND APPARATUS FOR SETTING AND CONTROLLING TEMPERATURE

This patent application relates to U.S. Provisional Application No. 60/801,302 filed May 18, 2006, from which priority is claimed under 35 USC §119(e), and which provisional application is incorporated herein in its entirety.

TECHNICAL FIELD OF THE INVENTION

One or more embodiments of the present invention relate to setting and controlling temperature of a device (such as, for example and without limitation, an electronic device such as a microelectronic device) under test.

BACKGROUND OF THE INVENTION

Microelectronic devices such as semiconductor integrated circuits ("ICs") are tested typically at full performance using complex and expensive IC testers. The temperature of the IC must be maintained at a fixed value during a test if test results are to be meaningful. In particular, significant deviations from the fixed value during the test may result in test failure of nominally good ICs, or in passing defective ICs as good units. However, maintaining the temperature of the IC at a fixed value becomes increasingly difficult as power dissipated by the IC is increased.

During testing of high power ICs, for example, the temperature of the high power IC is typically maintained at a fixed value by use of a thermal management plate it contact with a case of the IC. As such, the IC is maintained at a relatively stable temperature, notwithstanding variations in power dissipated by the IC during the test. As advances are made in the power and performance of modern ICs, accurate maintenance of temperature during testing is increasingly important in the manufacture of modern ICs and microelectronic devices.

Demands for increased reliability of microelectronic devices have led to testing these devices at two or more temperatures to detect defects that might not appear in testing performed at only one temperature. A typical approach to such testing involves, for example, testing at: (a) a low temperature of −55° C.; (b) a nominal operating temperature of 35° C.; and (c) a high temperature of +150°. In accordance with this approach, defects that appear only at a low temperature or at a high temperature may be detected. While it is efficient to mount the device on a socket once to do testing at each of the three temperatures, efficiency is lost because the socket and associated test electronics is idle while the temperature of the device is changed from one set point temperature to a next set point temperature. In response to this problem, several approaches have been tried in the prior art in attempts to reduce the time needed to make a transition from one set point temperature to the next, and thereby, to reduce idle time between tests done at these set point temperatures.

One prior art approach to setting and controlling temperature of a device under test involves flowing cooling fluid continuously through a thermal head (the test head is disposed in good thermal contact with the device) while the temperature of the cooling fluid is regulated by adding heat to, or removing heat from, the fluid—means for adding or removing heat include resistive heaters, heat exchangers, thermoelectric devices and refrigeration units. In practice, the device is kept at a first set point temperature by circulating the cooling fluid through the thermal head. Next, heat is added to the thermal head by, for example, resistive heating of an element in the thermal head to establish a second set point temperature. Finally, more heat is added to the thermal head, again by resistive heating, to establish a third set point temperature. This prior art approach enables additional heat to be added to or removed from the thermal head to compensate for changes in power dissipated by the device under test. Many variants of this approach have been tried in an effort to increase responsiveness in rapidly changing temperature without significantly degrading conduction of heat from the device to the cooling fluid. However, in most variants, one problem is that an increase in responsiveness is accompanied by a reduction in thermal conductivity of the thermal head. An additional problem results from a non-uniform temperature on the surface of the thermal head due to local resistive heating elements in the head. As such, this prior art approach of adding or removing heat is inadequate for responding to changes in a desired temperature rapidly.

Another prior art approach to setting and controlling temperature of a device under test involves using a Peltier effect cooler in a thermal head that is in contact on a first surface with the device under test and on a second surface with cooling fluid. In accordance with this approach, an electrical current flowing through junctions in the Peltier effect cooler induces heat transfer from the first surface to the second surface, thereby raising or lowering the temperature of the device under test in contact with the first surface with respect to a temperature of the cooling fluid. By controlling the magnitude and direction of the current, the temperature of the device is set and maintained. While Peltier effect coolers can be used to control temperature of a thermal head, their use is problematic in that their efficiency is inadequate for cooling high power devices or for controlling temperature over a wide range.

Yet another prior art approach to setting and controlling temperature of a device under test involves using several cooling fluids at two or more temperatures to set and control temperature of a thermal head. In accordance with this prior art approach, the fluids are mixed in a known proportion to establish a temperature of a fluid flowing through the thermal head. The temperature of the thermal head is changed by changing the proportion of fluids in confluence through the thermal head. This prior art approach is problematic in that control of temperature by mixing fluids of different temperatures is relatively slow compared to temperature changes induced by changes in instantaneous power dissipated by a device under test.

Yet another prior art approach to setting and controlling temperature of a device under test involves flowing a cooling fluid at a first temperature through an intake to a thermal head while a second cooling fluid at a second temperature is metered into the intake flow. By adjusting the metering rate, the temperature of the thermal head is controlled within limits set by the first and the second temperatures. Fluid exhausted from the thermal head is collected in a common return at a temperature intermediate between the first and second temperatures. This prior art approach suffers from a problem in that the exhaust flow of fluid must be brought to either the first or the second temperature before it can be circulated back to the thermal head, thereby resulting in delays and inefficiencies. Further, the fluid in the intake lines will change temperature due to losses to the ambient if a flow of each fluid is not maintained continuously.

Yet another prior art approach to setting and controlling temperature of a device under test involves regulating the temperature of a thermal head by turning on and off a flow of two or more thermal transfer fluids that flow through separate channels in a thermal head. Each of the fluids is obtained from a source at a different temperature. This prior art approach suffers from a problem in that a first fluid at a first temperature remains in the thermal test head after flow of the first fluid is shut off. This fluid must be heated by a flow of fluid at a second temperature, thereby slowing the transition of the thermal head from the first temperature to the second temperature. In addition, the thermal efficiency of such a thermal head is diminished because two or more fluid channels must be formed in the same thermal head, adding thermal mass that further slows the thermal response of the thermal head. This prior art approach also suffers from a problem in that there will be a non-uniformity in temperature due to the use of multiple channels in the thermal head that necessitates compromises between thermal efficiency and temperature uniformity.

Yet another prior art approach to setting and controlling temperature of a device under test involves regulating the temperature of a thermal head by turning on and off the flow of a multiplicity of thermal transfer fluids flowing through a channel in the thermal head. Each of the multiplicity of fluids is supplied at a different temperature, thereby allowing the temperature of the thermal head to be changed by switching on the flow of fluid of the desired temperature and switching off the flow of all other fluids. This prior art approach is problematic because it enables fluids in circuits that are switched off to change temperature by gain or loss of heat from the ambient while waiting to be switched on. Further, this prior art approach does not return fluid exhausted from the thermal head to the reservoir from whence it came. As such, the exhausted fluid must be heated or cooled before it is returned to the thermal head, causing additional inefficiencies and delays.

In light of the above, there is a need in the art for apparatus that solves one or more of the above-identified problems.

SUMMARY OF THE INVENTION

One or more embodiments of the present invention solve one or more of the above-identified problems. In particular, one embodiment of the present invention is a method for setting and controlling temperature of a device that comprises: (a) thermally contacting the device to a heat transfer apparatus, the heat transfer apparatus having an apparatus intake to receive thermal transfer fluid, an apparatus exhaust to output thermal transfer fluid, and a conduit to conduct thermal transfer fluid from the apparatus intake to the apparatus exhaust through the heat transfer apparatus; (b) flowing a first thermal transfer fluid in a first thermal control circuit at a first temperature, and flowing a second thermal transfer fluid in a second thermal control circuit at a second temperature; (c) at a first predetermined time, directing the first thermal transfer fluid to flow to the apparatus intake, and from the apparatus exhaust back to the first thermal control circuit and the second thermal transfer fluid to flow in the second thermal control circuit without flowing to the apparatus intake; and (d) at a second predetermined time, directing the second thermal transfer fluid to flow to the apparatus intake, and from the apparatus exhaust back to the second thermal control circuit and the first thermal transfer fluid to flow in the first thermal control circuit without flowing to the apparatus intake.

BRIEF DESCRIPTION OF THE DRAWING

FIG. 2A is a plot of temperature of the thermal head shown in FIG. 1 as a function of time;

FIGS. 2B, 2C and 2D are schematic representations of the fluid switch block and the thermal head shown in FIG. 1 illustrating the flow of thermal transfer fluid in a quiescent state, and in state 1, and state 2, respectively, of operation;

DETAILED DESCRIPTION

One or more embodiments of the present invention overcome problems in the prior art, and provide apparatus for setting and controlling temperature of a device under test with improved efficiency and thermal settling time. In accordance with one or more such embodiments, a temperature set and control apparatus incorporates a plurality of thermal control circuits, each flowing thermal transfer fluid at different temperatures. The temperature of a thermal head is set by switching a flow of thermal transfer fluid of a desired temperature through the thermal head while the thermal transfer fluid in each thermal control circuit continues to flow, whether or not thermal transfer fluid in the thermal control circuit is switched to flow through the thermal head. As such, and in accordance with one or more such embodiments, uninterrupted flow in each thermal control circuit overcomes a limitation of the prior art in that the thermal transfer fluid in each thermal control circuit is maintained at a predetermined temperature for that thermal control circuit, whereby a continuous flow of thermal transfer fluid avoids stagnation of thermal control fluid in locations where losses to the ambient cause an increase or decrease in temperature of stagnant thermal transfer fluid. In addition, and in accordance with one or more such embodiments, thermal transfer fluid exhausted from the thermal head is recaptured and switched back into the thermal control circuit from its origination, thereby substantially avoiding change of temperature of thermal transfer fluid flowing in the thermal control circuit as caused by mixing with fluids of differing temperature flowing in other thermal control circuits. As one can readily appreciate from this, in accordance with one or more embodiments of the present invention, single-insertion, multiple-temperature testing of a single device may be provided.

Figure 1:
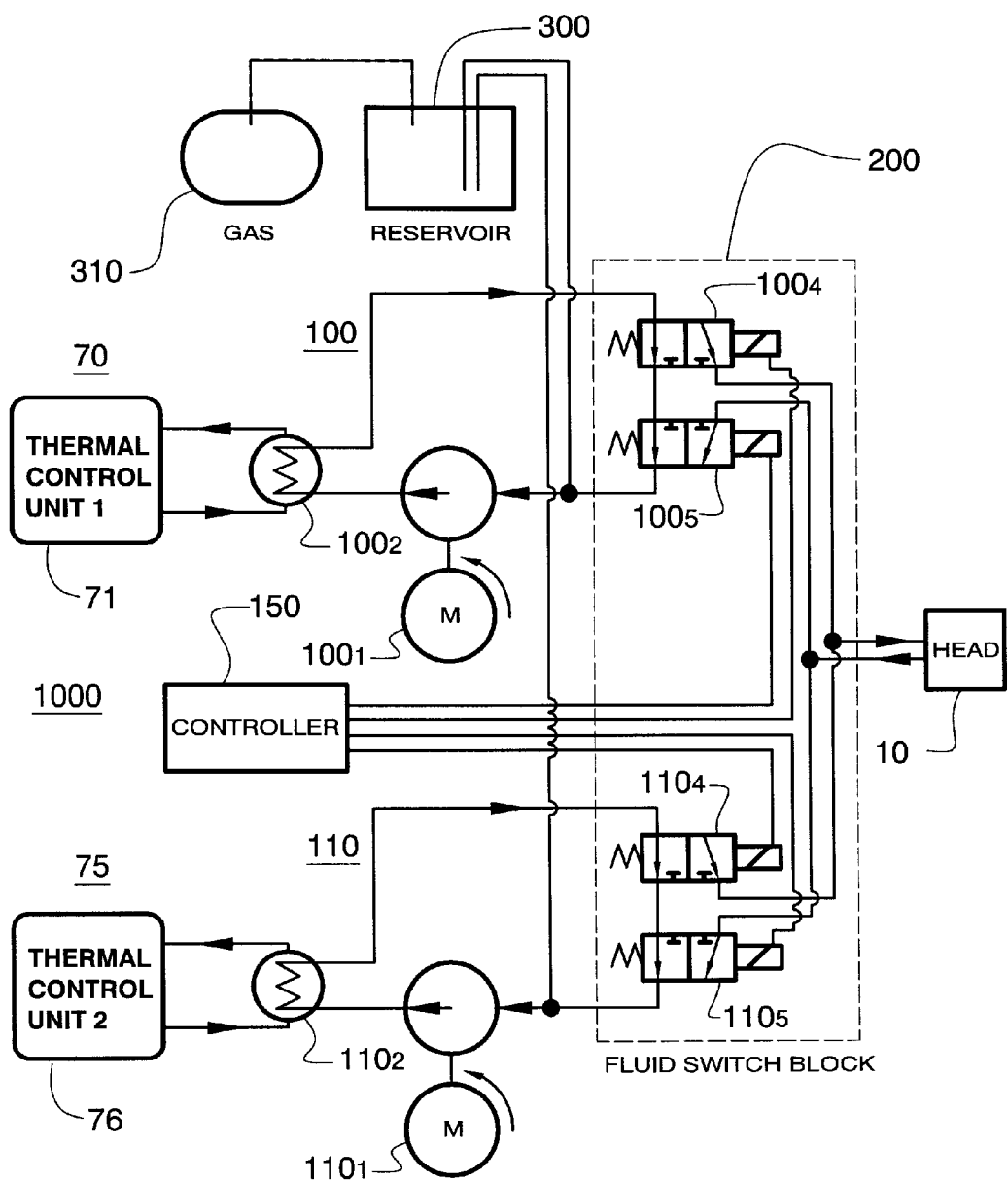
FIG. 1 is a schematic diagram of a temperature set and control apparatus for a device, which temperature set and control apparatus can switch between two temperatures, and which temperature set and control apparatus is fabricated in accordance with one or more embodiments of the present invention.

FIG. 1 is a schematic diagram of temperature set and control apparatus 1000 that is fabricated in accordance with one or more embodiments of the present invention. As will be described below, temperature set and control apparatus 1000 provides setting and controlling of temperature of thermal head 10 that is brought into contact with a device (such as, for example and without limitation, a microelectronic device and more specifically, a semiconductor integrated circuit) under test ("DUT") which is not shown. To perform testing using temperature set and control apparatus 1000: (a) the DUT is mounted in a fixture, for example and without limitation, a socket, that provides signal contact, for example and without limitation, electrical contact, between the DUT and automatic test equipment ("ATE"), for example and without limitation, electronic circuitry that provides test signals to, and receives responses from, the DUT; and (b) the DUT is maintained in good thermal contact with thermal head 10 that controls the temperature of the DUT. In accordance with one or more embodiments of the present invention, the temperature of the DUT is set and controlled by changing the temperature of thermal head 10, and the temperature of thermal head 10 is set and controlled, in turn, by flowing a thermal transfer fluid through thermal head 10 to bring it substantially to the temperature of the thermal transfer fluid (where the term "fluid" will be understood to encompass both liquids and gases). In accordance with one or more embodiments of the present invention, thermal head 10 comprises: (a) a plate having a surface area configured to couple to the DUT to transfer heat to and from the DUT by way of heat conduction; and (b) a heat exchanger connected to the plate to set a temperature of the surface area of the plate to one of a range of temperatures by heat conduction. In accordance with one or more such embodiments, the plate spreads heat to present a uniform temperature to the DUT. In addition, in accordance with one or more such embodiments, the plate has low thermal capacity (i.e., the plate is incapable of storing much thermal energy) and high thermal conductivity (i.e., the plate is capable of transferring thermal energy rapidly). Rapid rates of change of temperature are enabled, in part, by minimizing the heat capacity of the plate as much as practicable. However, a need to reduce the heat capacity of the plate should be balanced against a need for high thermal conductivity so that heat may be more rapidly transferred between the plate and the heat exchanger. This balancing enables the plate to achieve rapid thermal equilibrium with the heat exchanger when the temperature of the heat exchanger is changed. In accordance with one or more embodiments of the present invention, a balance between low heat capacity and high thermal conductivity is struck by manufacturing the plate from a thin sheet (for example and without limitation, 0.060 inches thick) of highly thermally conductive material such as copper. In addition, to ensure good thermal contact between the DUT and the plate, optional conductive coatings and structures may be placed on the plate to improve thermal conductance to the DUT (improving thermal conductance improves temperature set and control performance). For example, a contacting material may be attached to the plate to contact the DUT—for example and without limitation, a compliant sheet of metal impregnated plastic can be attached to the DUT side of the plate. However, the contacting material need not be as thermally conductive as the material of the plate. In further addition, optionally, fixture (socket) assemblies used to receive a DUT may allow helium gas to be injected (this allows helium to displace air between thermal head 10 and the DUT) since helium is more thermally conductive than air, and thereby, to improve performance. In accordance with one or more embodiments of the present invention, the plate is substantially planar since, in practice, most DUTs have a flat or planar lid or case that serves as a mating surface. Of course, the size and shape of the contact surface of the thermal head may be configured to mate with a size and shape of the particular DUT. Alternatively, a suitably configured mating element, formed from a thermal conductor, can be placed between the thermal head and the DUT (a mating element may be desirable to accommodate specific physical characteristics of the DUT or to concentrate heat transfer in certain areas of the DUT). As such, it should be understood that the term plate is used to refer to any device or portion of a device that uniformly spreads heat.

In accordance with one or more embodiments of the present invention, the thermal head includes a conduit (for example and without limitation, a set of channels) that conducts fluid therethrough. In accordance with one or more such embodiments, such channels may be microchannels, for example and without limitation, for use preferably when the fluid is a gas. For example and without limitation, in accordance with one or more such embodiments, the thermal head comprises a block of thermally conductive material with microchannels for fluid flow within the block. In addition, in accordance with one or more further embodiments of the present invention, the thermal head includes a set of channels that are interdigitated so that walls between the channels are relatively thin to maximize thermal conductivity, reduce thermal gradients, and promote uniform temperatures across a surface of a plate that overlays the interdigitated channels. In accordance with one or more further embodiments of the present invention, the set of channels includes a single serpentine channel that switches back and forth. In accordance with one or more still further embodiments of the present invention, the plate may be a lid for covering the interdigitated channels—using the plate to cover the channels enables the plate to contact the thermal transfer fluid to promote heat transfer between the thermal transfer fluid, as well as between the DUT and the thermal head.

In accordance with one or more embodiments of the present invention, thermal head 10 may be integrated into an ATE so that thermal head 10 is in good thermal contact with the DUT during functional testing. In addition, and in accordance with one or more embodiments of the present invention, depending on whether the ATE is for use in testing packaged devices or bare dies (unpackaged bare chips), an electrical test path for electrically testing the DUT may be either a test head for testing packaged semiconductor devices or a prober for testing dies of a semiconductor wafer, respectively. Still further, in accordance with one or more embodiments of the present invention, the ATE may comprise a device handler that includes a chuck that receives the DUT. In such a case, depending on whether the ATE is for testing packaged devices or bare dies, the chuck may be capable of receiving and holding either a packaged semiconductor device or a semiconductor wafer, respectively. Still yet further, in accordance with one or more embodiments of the present invention, thermal transfer fluid may also pass through a socket for receiving the DUT in order to control the temperature of the socket. In accordance with one or more such embodiments, the thermal transfer fluid may pass through channels in thermal contact with the socket, through a chamber enclosing the DUT and socket, or through another connecting structure between the fluid and the socket.

In accordance with one embodiment of the present invention, the thermal transfer fluid is water. Further, in accordance with one or more such embodiments, hydrostatic pressure forces a flow of water through thermal head 10, thereby bringing the temperature of thermal head 10 approximately to the temperature of the water. The hydrostatic pressure of the water in thermal head 10 ought to be high enough to prevent boiling at the highest temperatures of operation of temperature set and control apparatus 1000. While water is an efficient thermal transfer fluid, other thermal transfer fluids may also be used in fabricating further embodiments of the present invention, where the choice may depend upon a temperature range and thermal flux requirements of a particular testing regimen. In accordance with one or more embodiments of the present invention, the thermal transfer fluid ought to: (a) have a low and relatively flat viscosity over the desired temperature range so that it can be pumped; (b) have a thermal capacity which is high enough over the desired temperature range so that it can serve as an efficient heat exchange medium; (c) optionally, be a safe chemical so that no injuries will result if any part of the human body is exposed thereto; and (d) optionally, be a dielectric so that it will not electrically short any circuit onto which it might be spilled. For example and without limitation, the thermal transfer fluid may include glycol water mixtures, Formalin® (available from 3M Corporation, St. Paul, Minn.), Galden® (available from Solvay Chemicals, Inc., Houston, Tex.), silicone oil, hydrocarbon oils, air, $CO_2$, helium, nitrogen, helium-hydrogen, and other gas mixtures. In accordance with one or more such embodiments of the present invention, the hydrostatic pressure of the thermal transfer fluid as it flows through thermal head 10 is set to provide a flow rate which results in good thermal efficiency of heat transfer to and from thermal head 10 (the flow rate of a thermal transfer fluid is adjusted since the temperature of a surface area of a plate to which the DUT is contacted has a functional relationship to the flow rate and temperature of the thermal transfer fluid). As such, this is largely a function of the thermal head design used in a particular application. In addition, flow rates may be varied across a temperature range, with a higher flow rate being used with higher thermal transfer fluid temperatures and a lower flow rate used for lower temperatures due to a typically higher viscosity. For example and without limitation, for an embodiment using helium as the thermal transfer fluid, a hydrostatic pressure of between 60 psig and 600 psig, and preferably between 80 psig and 200 psig, may be used (where psig is pressure is pounds per square inch above atmospheric pressure).

As indicated in FIG. 1, thermal transfer fluid flows continuously in two thermal control circuits (thermal control circuit 100 and thermal control circuit 110, respectively), wherein the thermal transfer fluid in thermal control circuit 100 is maintained at a higher temperature $T_1$ and the thermal transfer fluid in thermal control circuit 110 is maintained at a lower temperature $T_2$. As will be described below, the thermal transfer fluids are heated or cooled to their predetermined temperatures away from thermal head 10 by equipment that operates according known methods, for example and without limitation, the equipment includes pumps for flowing the thermal transfer fluids and a control circuit that sets the rates of flow for each thermal transfer fluid.

As shown in FIG. 1: (a) thermal transfer fluid in thermal control circuit 100 is pumped in a cycle by pump $100_1$, through heat exchanger $100_2$, to fluid switch block 200, through channels in fluid switch block 200, and back to pump $100_1$; and (b) thermal transfer fluid in thermal control circuit 110 is pumped in a cycle by pump $110_1$, through heat exchanger $110_2$, to fluid switch block 200, through channels in fluid switch block 200, and back to pump $110_1$. In accordance with one or more embodiments of the present invention, the thermal transfer fluid is water, and a flow rate of the thermal transfer fluid in each of thermal control circuits 100 and 110 is maintained at 1-3 gallons of water per minute by pumps $100_1$ and $110_1$, respectively, each of which is a Procon pump. Fluid reservoir 300, in fluid communication with thermal control circuits 100 and 110, accommodates expansion of thermal transfer fluid in thermal control circuits 100 and 110, and enables pressurization of thermal control circuits 100 and 110 by introducing nitrogen or other gas into fluid reservoir 300 from gas supply system 310. In accordance with one or more embodiments of the present invention, fluid reservoir 300 is a type 316 stainless steel pressure tank (with gas inlet and fluid inlet and outlet fittings) that is available from McMaster-Carr of Santa Fe Springs, Calif.

As further shown in FIG. 1: (a) heat exchanger $100_2$ maintains the temperature of thermal transfer fluid in thermal control circuit 100 at a higher temperature $T_1$ by transfer of heat to or from a separate thermal transfer fluid flowing in circulating loop 70 from temperature control unit 71 through heat exchanger $100_2$ and back to temperature control unit 71; and (b) heat exchanger $110_2$ maintains the temperature of thermal transfer fluid in thermal control circuit 110 at a lower temperature $T_2$ by transfer of heat to or from a separate thermal transfer fluid flowing in circulating loop 75 from temperature control unit 76 through heat exchanger $110_2$ and back to temperature control unit 76. In accordance with one or more embodiments of the present invention, a Neslab EX-250 chiller available from Thermo Electron Corporation of Waltham, Mass. is a typical thermal control unit suitable for use in circulating loop 70 for higher temperature, for example and without limitation, $T_1$=50° C., and a Neslab model M-33 low temperature bath/circulator available from the Thermo Electron Corporation is a typical thermal control unit suitable for use in circulating loop 75 for a lower temperature, for example and without limitation, $T_2$=10° C. Lastly, as indicated in FIG. 1, in a quiescent state, thermal transfer fluid flows unimpeded in thermal control circuits 100 and 110 without being routed through thermal head 10. In accordance with one or more embodiments of the present invention, tubing for conduction of thermal transfer fluid in thermal control circuits 100 and 110 is a PTFE high temperature organic material that is reinforced with a sheath of woven stainless steel.

In operation of temperature set and control apparatus 1000 for use in testing, for thermal head 10 to reach first temperature $T_1$ rapidly, fluid switch block 200 is activated to a first state (state 1) that causes it to direct thermal transfer fluid flowing in thermal control circuit 100 to flow to thermal head 10 rather than continuing to flow to a return path of thermal control circuit 100. As one can readily appreciate from FIG. 1, activation of fluid switch block 200 into state 1 also directs thermal transfer fluid received from thermal head 10 to flow back into a return path of thermal control circuit 100. In accordance with one or more embodiments of the present invention, directing thermal transfer fluid from thermal control circuit 100 at temperature $T_1$ to flow through thermal head 10 brings it rapidly to temperature $T_1$. Further, in order to reduce a response time of thermal head 10 to the switched flow of thermal transfer fluid from fluid switch block 200, the distance between fluid switch block 200 and thermal head 10 may be less than 50 cm, and preferably less than 10 cm.

In accordance with one or more embodiments of the present invention, the flow of thermal transfer fluid in fluid switch block 200 is directed by pairs of fluidic switches (pair of switches $100_4$ and $100_5$ and pair of switches $110_4$ and $110_5$), one pair disposed in each of thermal control circuits 100 and 110, respectively. In accordance with one or more embodiments of the present invention, each of fluidic switches $100_4$, $100_5$, $110_4$, and $110_5$ are solenoid-actuated, fluidic switches. In particular, as shown in FIG. 1, in accordance with one or more embodiments of the present invention, on entering fluid switch block 200: (a) thermal transfer fluid in thermal control circuit 100 is directed (for example, and without limitation, by channels) to intake fluidic switch $100_4$ that is able to switch the flow of thermal transfer fluid: (i) to thermal head 10 or (ii) to exhaust fluidic switch $100_5$; and (b) thermal transfer fluid in thermal control circuit 110 is directed (for example, and without limitation, by channels) to intake fluidic switch $110_4$ that is able to switch the flow of thermal transfer fluid: (i) to thermal head 10 or (ii) to exhaust fluidic switch $110_5$. Further, in accordance with one or more embodiments of the present invention: (a) exhaust fluidic switch $100_5$ is connected to receive a flow of thermal transfer fluid: (i) from thermal head 10 or (ii) from intake fluidic switch $100_4$, and to direct a flow of thermal transfer fluid back to thermal control circuit 100 and out of fluid switch block 200; and (b) exhaust fluidic switch $110_5$ is connected to receive a flow of thermal transfer fluid: (i) from thermal head 10 or (ii) from intake fluidic switch $110_4$, and to direct a flow of thermal transfer fluid back to thermal control circuit 110 and out of fluid switch block 200. Preferably, the intake and the exhaust fluidic switches of a switch pair in each thermal control circuit are activated at approximately the same time, for example and without limitation, within about 3 to 100 milliseconds, thereby enabling a continuous flow of thermal transfer fluid in a thermal control loop: (a) from an intake fluidic switch to an exhaust fluidic switch and out of fluid switch block 200; or (b) from an intake fluidic switch to thermal head 10 and then back to an exhaust fluidic switch where it is directed out of fluid switch block 200. In accordance with one or more further embodiments of the present invention, activation of exhaust fluidic switch $100_5$ is about 3 to 30 milliseconds later than activation of intake fluidic switch $100_4$ to allow time for fluid from thermal control loop 100 to transit from intake fluidic switch $100_4$ to exhaust fluidic switch $100_5$, thereby minimizing loss of fluid from thermal control circuit 100 (and similarly for intake and exhaust fluidic switches $110_4$ and $110_5$). In accordance with one or more embodiments of the present invention, activation of the solenoid-actuated, fluidic switches is controlled using electrical currents generated by activation controller 150 over electrical connections shown in FIG. 1. In accordance with one or more embodiments of the present invention, activation controller 150 may be fabricated utilizing an Intel 8085 microcontroller which provides input to high power transistor output drivers that supply current to solenoid coils of fluidic switches $100_4$, $100_5$, $110_4$, and $110_5$ which are available, for example and without limitation, from Clippard Instrument Company, Inc., of Cincinnati, Ohio. In accordance with one or more embodiments of the present invention, activation controller 150 controls the sequence of temperature changes in accordance with a "recipe" or "script" or "profile" that may be input using an operator interface terminal in accordance with any one of a number of methods that are well known to those of ordinary skill in the art. For example, and without limitation, in accordance with one or more embodiments of the present invention, activation controller 150 executes software which interfaces to an operator via an operator interface terminal. The software may include a commercial operating system such as, for example and without limitation, an appropriate version of a Window™ operating system and custom software developed routinely and without undue experimentation by one of ordinary skill in the art to perform functions of activation controller 150. In accordance with one or more such embodiments, a touch screen may be used to simplify operation, but a keyboard/mouse interface may be used as well. As will be readily appreciated by one of ordinary skill in the art, a variety of other software environments and user interfaces could also be used. In accordance with one or more such embodiments, the software enables "profiles" to be defined and stored, which profiles specify temperatures, how long to maintain the temperatures, and how to change to new temperatures. Typically, this can be time related, or advanced by signals from an external source, such as automatic test equipment used to test the DUT. Thus, activation controller 150 determines when and how long to maintain the temperature of thermal head 10, and causes that to occur. In accordance with one or more further embodiments of the present invention, activation controller 150 operates in response to one or more testing criteria, operating conditions, or feedback signals. For example, activation controller 150 may operate in response to any of the following: a test temperature setting associated with a current testing specification for the DUT; an input signal utilized by the DUT, for example and without limitation, an input power signal, an input voltage, or an input current; a signal indicative of a real-time operating temperature of the DUT; a signal indicative of a real-time operating temperature of an internal component of the DUT, for example and without limitation, a semiconductor die; a signal indicative of a real-time temperature of thermal head 10; an RF signature of the DUT; or the like.

In accordance with one or more embodiments of the present invention, activation controller 150 communicates with a test control system. In accordance with one or more such embodiments, the test control system would carry out appropriate tests on the DUT while temperature set and control apparatus 1000 would control the DUT temperature. As such, these two control systems might communicate or otherwise coordinate their activities. Either temperature set and control apparatus 1000 or the test control system can monitor a thermal structure. In accordance with one or more embodiments of the present invention, the test control system would monitor a thermal structure of the DUT, and send a signal indicating the DUT temperature (such as, for example and without limitation, a scaled voltage) to temperature set and control apparatus 1000. In accordance with one or more further embodiments of the present invention, the two systems are separate and have no direct communication—both systems monitor the DUT to gain DUT temperature information to coordinate their activities. In accordance with one or more still further embodiments of the present invention, the two systems are fully integrated.

FIG. 2A is a plot of temperature of thermal head 10 of FIG. 1 as a function of time. As one can appreciate from FIG. 2A, the temperature of thermal head 10 in a quiescent state is about 10° C. In the quiescent state, thermal transfer fluid flows in each of temperature control circuits 100 and 110 without flowing through thermal head 10, as is shown in detail in FIG. 2B. At time $t_1$ (as indicated in FIG. 2A), fluid switch block 200 is activated to state 1 wherein thermal transfer fluid from thermal control circuit 100 is directed to flow through thermal head 10 and then back to thermal control circuit 100—as shown in detail in FIG. 2C—while thermal transfer fluid flows in thermal control circuit 110 without flowing through thermal head 10. As one can readily appreciate from the plot of FIG. 2A, the temperature of thermal head 10 rises rapidly to a first control temperature $T_1$ of 50° C. (the temperature of thermal control circuit 100)—reaching a temperature within ±2° C. of $T_1$ after a two (2) second transition time.

At time $t_2$ (as indicated in FIG. 2A), fluid switch block 200 is activated to state 2 wherein: (a) thermal transfer fluid from thermal control circuit 100 is shunted back into thermal control circuit 100 without flowing through thermal head 10; and (b) thermal transfer fluid in thermal control circuit 110 is directed to flow through thermal head 10 and then back to thermal control circuit 110—as shown in detail in FIG. 2D. As one can readily appreciate from the plot of FIG. 2A, upon entering state 2 at time $t_2$, the temperature of thermal head 10 falls rapidly to a second control temperature $T_2$ of 10° C. (the temperature of thermal control circuit 110)—reaching a temperature within ±2° C. of $T_2$ after a two (2) second transition time. After carrying out a test sequence in accordance with any one of a number of methods that are well known to those of ordinary skill in the art, temperature set and control apparatus 1000 may be returned to the quiescent state in which thermal transfer fluid in each of thermal control circuits 100 and 110 flows without passing through thermal head 10.

As such, in light of the description above in conjunction with FIG. 1, one can readily appreciate that, in accordance with one or more embodiments of the present invention, the temperature of a thermal head may be changed rapidly from a first temperature to a second temperature by switching a flow of thermal transfer fluids flowing in a plurality of thermal control circuits so that a flow of thermal transfer fluid in each thermal control circuit is routed through the thermal head in sequence. In accordance with one or more further embodiments, a flow of thermal transfer fluid in each thermal control circuit is maintained during a switching cycle, regardless of whether the thermal transfer fluid is switched to flow through the thermal head or it is shunted back into the thermal control circuit without flowing through the thermal head. As described above in conjunction with FIG. 1, and in accordance with one or more embodiments of the present invention, thermal transfer fluid in each thermal control circuit flows independently of thermal transfer fluid in the other thermal control circuits. However, a small amount of thermal transfer fluid in one thermal control circuit is typically mixed with thermal transfer fluid in another in accordance with one or more embodiments of the present invention, during the fluid switching transition. In accordance with one or more further embodiments of the present invention, the same thermal transfer fluid is used in each of the thermal control circuits of such embodiments, and one reservoir of such thermal transfer fluid is used to moderate a supply of thermal transfer fluid to each thermal control circuit at a uniform pressure so that any mixing of thermal transfer fluid is of no consequence. In accordance with one or more still further embodiments of the present invention, the reservoir is pressurized with a gas such as, for example and without limitation, nitrogen or helium in order to maintain a predetermined minimum pressure in each thermal control circuit. In addition, in accordance with one or more still further embodiments of the present invention, thermal control circuits operating at extremes of temperature, pumps may be protected from the effects of the temperature by passing the thermal transfer fluid through a counter flow heat exchanger on the way to and from the pump so as to thermally isolate the pump.

For use in testing, to determine when the thermal head has reached a predetermined temperature, in accordance with one or more embodiments of the present invention, the temperature of the thermal head may be sensed using any one of a number of methods that are well known to those of ordinary skill in the art including use of thermocouple sensors, thermistors, resistive sensors, diode sensors, IR emission sensors, and any other means for sensing temperature. For example and without limitation, the thermal head may include a suitably placed channel configured to carry a thermocouple sensor wire that communicates with, and enables, the activation controller to monitor the temperature of the thermal head; where the temperature of the thermal head may be used as a safety measure (to detect overheating), and/or as a feedback signal to adjust the temperature and/or flow rate of the thermal transfer fluid. In accordance with one or more such embodiments, the temperature sensor may be coupled in a feedback arrangement with the activation controller so that the activation controller can ensure that the temperature of the thermal transfer fluid is at a desired temperature. In addition, the temperature of the thermal head may also be determined by calculations based on a measurement of the temperature of the thermal transfer fluid entering and exiting the thermal head. In further addition, the thermal power dissipated by the DUT can be determined by calculations based on: (a) a temperature drop of the thermal transfer fluid as measured in the thermal transfer fluid entering the thermal head and in the thermal transfer fluid leaving the thermal head; and (b) a flow of thermal transfer fluid of known heat capacity and density. The temperature and power thusly derived may be used to regulate the temperature of the thermal head by adjusting the temperature of the thermal transfer fluid flowing through the thermal head by an amount determined mathematically from inputs of temperature drop between intake and exhaust of the thermal head, and flow rate of the fluid. As an example, a calculation of power P dissipated by the DUT may be used to regulate feedback to thermal transfer fluid flowing to the thermal head. Power is $P=(T_e-T_i)Fc\sigma$, where P is power in watts; $T_e$ and $T_i$ are exhaust and intake temperatures in ° C. respectively; F is flow rate in cc per second; c is heat capacity in Joules per gram—° C.; and $\sigma$ is density in grams per cc. A temperature sensor is particularly useful when the DUT is a "self-heating" device, such as a highly integrated semiconductor device that dissipates large amounts of heat. Properly controlling the temperature of a self-heating device typically requires characterizing the operating characteristics of an average self-heating chip. Controlling the temperature of devices that are not self-heating can typically be done in view of the nominal temperatures and flow rates of the thermal transfer fluids used by the thermal head without regard to operating characteristics of the DUT. Further, in accordance with one or more further embodiments of the present invention, a temperature sensor aperture may be formed in the thermal head to provide a line of sight to the DUT so that a non-contacting temperature sensor such as, for example and without limitation, a pyrometric temperature sensor, can detect the temperature thereof.

In further addition, in accordance with one or more embodiments of the present invention, the temperature of the thermal transfer fluid may be determined at a number of positions using suitably placed temperature sensors. For example and without limitation, the temperature of the thermal transfer fluid may be determined as it flows through an intake switch or as it leaves to return to a thermal control circuit. In such embodiments, the temperature sensor may be coupled in a feedback arrangement with the activation controller.

In addition to the use of thermal transfer fluid switching in accordance with one or more embodiments of the present invention, the temperature of the thermal head may be regulated by a small amount using any one of a number of methods that are well known to those of ordinary skill in the art such as, for example and without limitation: (a) metering an additional amount of thermal transfer fluid at a set temperature into a flow of thermal transfer fluid into the thermal head; (b) adding heat directly to the thermal head by resistive heating of the thermal head; (c) adding heat to the thermal transfer fluid before it flows into the thermal head; (d) interposing a resistive heater between the thermal head and the DUT; (e) interposing a Peltier effect cooler between the thermal head and the DUT; and (f) transferring heat to thermal transfer fluid by a Peltier effect device. In accordance with one or more embodiments of the present invention, the activation controller receives a signal indicative of input power to the DUT and a signal indicative of a real-time operating temperature of a portion of the DUT (such as, for example and without limitation, a die contained in the DUT); and these signals are processed by the activation controller according to a temperature control algorithm to operate the temperature set and control apparatus. For example, a simple algorithm may adjust operation in response to the measured temperature of the DUT such that the operating temperature of the DUT is maintained at a specific temperature.

Additional aspects of one or more further embodiments of the present invention may be understood by reference to FIG. 1. In accordance with one or more such further embodiments, the temperature of thermal head 10 may be set and controlled to a temperature $T_a$ that is intermediate between temperature $T_1$ of thermal transfer fluid in thermal control circuit 100 and temperature $T_2$ of thermal transfer fluid in thermal control circuit 110. To do this in accordance with one or more such further embodiments, thermal transfer fluid from thermal control circuit 100 is switched to flow through thermal head 10 for a short time interval of length $t_1$, by appropriately activating fluidic switches $100_4$, $100_5$, $110_4$, and $110_5$ by electrical signals from activation controller 150 (see discussion herein). Then, in a next short time interval of length $t_2$, thermal transfer fluid from thermal control circuit 110 is switched to flow through thermal head 10 by appropriately activating fluidic switches $100_4$, $100_5$, $110_4$, and $110_5$ by electrical signals from activation controller 150 (see discussion herein). Then, in a next short time interval of length $t_1$, thermal transfer fluid from thermal control circuit 100 is again switched to flow through thermal head 10. Thus, by alternating the flow of thermal transfer fluid, first from thermal control circuit 100 for a time interval $t_1$, and then from thermal control circuit 110 for a time interval $t_2$, the average temperature of thermal head 10 may be set to any temperature between $T_1$ of thermal transfer fluid in thermal control circuit 100 and $T_2$ of thermal transfer fluid in thermal control circuit 110. For the case in which the rate of flow of thermal transfer fluid in thermal control circuit 100 is equal to the rate of flow in thermal control circuit 110, the average temperature $T_a$ of thermal head 10 is approximately $T_a=(T_1 t_1+T_2 t_2)/(t_1+t_2)$. In order to achieve accurate control of temperature $T_a$, the time intervals $t_1$ and $t_1$ are preferably less than the time response of thermal head 10 to a change in temperature of thermal transfer fluid flowing through it. More preferably, time intervals $t_1$ and $t_2$ are less than 0.1 seconds. Those of ordinary skill in the art should readily understand, that in accordance with further such embodiments comprised of a multiplicity of thermal control circuits, the temperature of the thermal head may be set and controlled by alternating flows in the thermal head in the manner described among between predetermined pairs of thermal control circuits by appropriate action of the activation controller.

Figure 3:
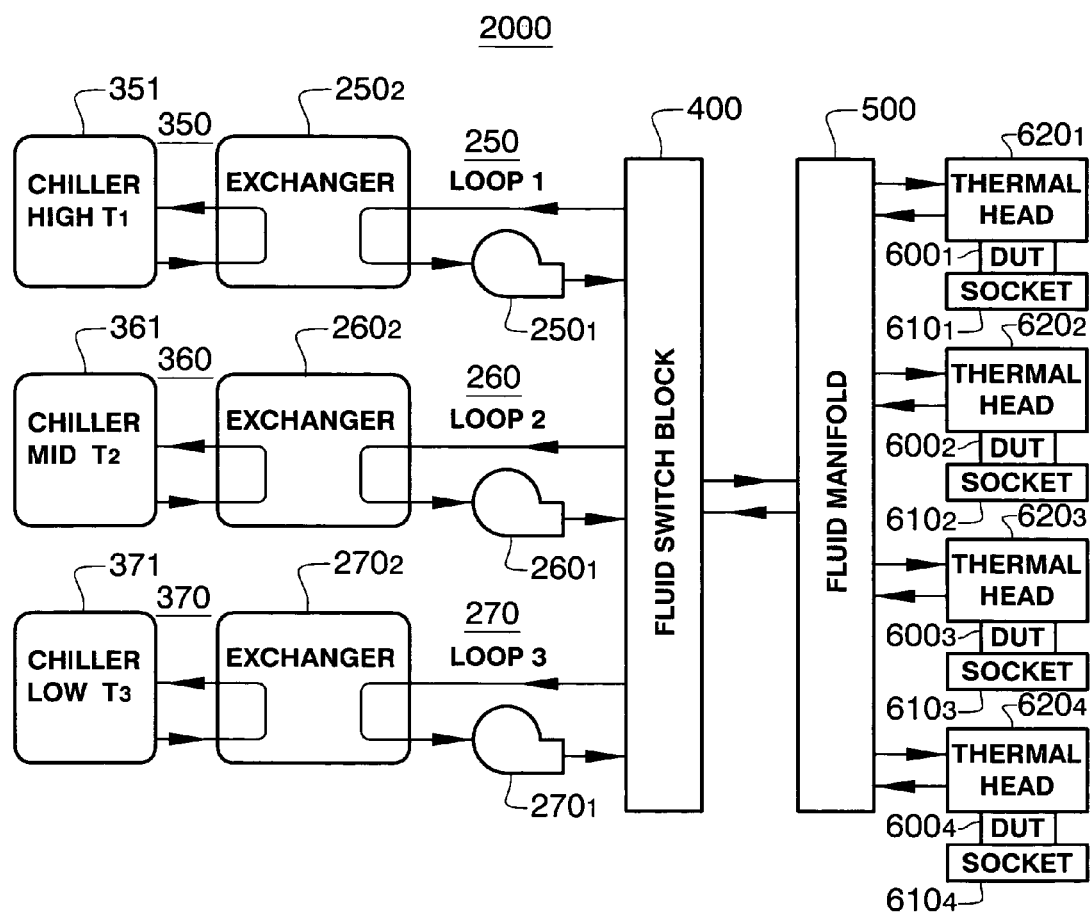
FIG. 3 is a schematic diagram of a temperature set and control apparatus that is fabricated in accordance with one or more embodiments of the present invention, which temperature set and control apparatus can set and control the temperature of one or more of an array of devices under test ("DUT") among three different temperatures.

Electronic devices, such as integrated circuit chips, are usually tested prior to use. Device manufacturers typically perform a number of electrical and physical tests to ensure that the devices are free from defects, and that the devices function according to their specifications. Common types of device testing include burn-in testing and electrical performance testing. FIG. 3 is a schematic diagram of temperature set and control apparatus 2000 that is fabricated in accordance with one or more embodiments of the present invention wherein temperature set and control apparatus 2000 can set and control the temperature of one or more of an array of devices under test ("DUTs") among three different temperatures. As such, one or more such embodiments of the present invention enable testing of electronic devices at three temperatures rapidly. Alternatively, the DUTs may be any electronic, mechanical, or other device being subjected to one or more tests performed under specific temperature settings. Further, temperature set and control apparatus 2000 may cooperate with a suitable testing system (not shown) that provides a power supply, input signals, and possibly other inputs to DUT. A typical testing system also monitors a number of outputs and signals generated by the DUTs during test procedures.

As shown in FIG. 3, thermal transfer fluid flows continuously in thermal control circuits 250, 260, and 270, wherein thermal control circuit 250 is maintained at a highest temperature $T_1$, thermal control circuit 260 is maintained at a lower temperature $T_2$, and thermal control circuit 270 is maintained at a lowest temperature $T_3$. As shown in FIG. 3: (a) thermal transfer fluid in thermal control circuit 250 is pumped in a cycle by pump $250_1$, through heat exchanger $250_2$, to fluid switch block 400, and back to pump $250_1$; (b) thermal transfer fluid in thermal control circuit 260 is pumped in a cycle by pump $260_1$, through heat exchanger $260_2$, to fluid switch block 400, and back to pump $260_1$; and (c) thermal transfer fluid in thermal control circuit 270 is pumped in a cycle by pump $270_1$, through heat exchanger $270_2$, to fluid switch block 400, and back to pump $270_1$. A fluid reservoir (not shown) like that shown in FIG. 1, in fluid communication with thermal control circuits 250, 260, and 270, accommodates expansion of thermal transfer fluid in thermal control circuits 250, 260, and 270, and enables pressurization of the thermal control circuits by introducing nitrogen or other gas into the fluid reservoir 400. As further shown in FIG. 3: (a) heat exchanger $250_2$ maintains the temperature of thermal transfer fluid in thermal control circuit 250 at highest temperature $T_1$ by transfer of heat to or from a separate thermal transfer fluid flowing in circulating loop 350 from temperature control unit 351 (for example and without limitation, a chiller) through heat exchanger $250_2$ and back to temperature control unit 351; (b) heat exchanger $260_2$ maintains the temperature of thermal transfer fluid in thermal control loop circuit at a lower temperature $T_2$ by transfer of heat to or from a separate thermal transfer fluid flowing in circulating loop 360 from temperature control unit 361 (for example and without limitation, a chiller) through heat exchanger $260_2$ and back to temperature control unit 361; and (c) heat exchanger $270_2$ maintains the temperature of thermal transfer fluid in thermal control circuit 270 at a lowest temperature $T_3$ by transfer of heat to or from a separate thermal transfer fluid flowing in circulating loop 370 from temperature control unit 371 (for example and without limitation, a chiller) through heat exchanger $270_2$ and back to temperature control unit 371.

As further shown in FIG. 3, devices under test (DUTs) $600_1$-$600_4$ are inserted in an array of sockets (the array of sockets includes sockets $610_1$-$610_4$) wherein each socket is each associated with a thermal head in an array of thermal heads (the array of thermal heads includes thermal heads $620_1$-$620_4$) and wherein each thermal head is in good thermal contact with a DUT in an associated socket. In accordance with one or more embodiments of the present invention, DUTs and their associated sockets may be clamped together the DUTs may be held against the thermal heads using a vacuum device or any suitable holding mechanism.

As further shown in FIG. 3, fluid manifold 500 distributes transfer fluid supplied thereto from fluid switch block 400 which is disposed in close proximity to fluid manifold 500, for example and without limitation, within about 10 cm to 50 cm. Further, as will be described below, the transfer fluid supplied to fluid manifold 500 is supplied from one of thermal control circuits 250, 260, or 270 to each thermal head in the array (i.e., to thermal heads $620_1$-$620_4$). In accordance with one or more embodiments of the present invention, the temperature of each thermal head in the array is maintained by a flow of a thermal transfer fluid at a given temperature through each of the thermal heads, and, in turn, each thermal head maintains the temperature of the DUT contacted thereto.

As one can appreciate from the description above regarding temperature set and control apparatus 1000, in operation of temperature set and control apparatus 2000, thermal transfer fluid is supplied to fluid manifold 500 from fluid switch block 400 wherein the thermal transfer fluid is supplied to and from fluid switch block 400 by three thermal control circuits, a highest temperature thermal control circuit 250, a lower temperature thermal control circuit 260, and a lowest temperature thermal control circuit 270. As one can further appreciate from the description above, in each of the three thermal control circuits 250, 260, and 270, thermal transfer fluid is held at a predetermined temperature by flowing through a heat exchanger, a pump, fluid switch block 400 and back to the heat exchanger. Further, as was described above, each heat exchanger is linked on its primary side to a circulating fluid from a temperature control unit (for example and without limitation, a chiller). In addition, in accordance with one or more embodiments of the present invention, fluid manifold 500 may comprise an intake plenum connected to provide thermal transfer fluid to the thermal heads (for example and without limitation, to an input or intake port of each thermal head) and an exhaust plenum connected to receive thermal transfer fluid from the thermal head (for example and without limitation, from an output or exhaust port of each thermal head). It will be appreciated by those of ordinary skill in the art that the term fluid manifold may also referred to in the art as a manifold or as a manifold assembly or a fluid distribution mechanism and the like.

In a quiescent state, in accordance with one or more embodiments of the present invention, thermal transfer fluid in each of thermal control circuits 250, 260, and 270 flows freely, i.e., without flowing to or from fluid manifold 500. Of the three thermal control circuits 250, 260, and 270, thermal control circuit 250 is maintained at a highest temperature $T_1$, thermal control circuit 260 is maintained at a lower temperature $T_2$, and thermal control circuit 270 is maintained at a lowest temperature $T_3$. In accordance with one or more embodiments of the present invention, in operation of temperature set and control apparatus 2000 for use in testing, fluid switch block 400 is activated to a first state (state 1) that causes it: (a) to block the flow of thermal transfer fluid to and from fluid manifold 500 from thermal control circuits 260 and 270 by shunting thermal transfer fluid output therefrom (which flows into intakes of fluid switch block 400) to exhausts of fluid switch block 400 and back into thermal control circuits 260 and 270, respectively (without the thermal transfer fluid from thermal control circuits 260 and 270 being routed to fluid manifold 500); and (b) to direct thermal transfer fluid at temperature $T_1$ flowing in thermal control circuit 250 to flow to fluid manifold 500 rather than continuing to flow to a return path into thermal control circuit 250. In addition, thermal transfer fluid received by fluid switch block 400 from fluid manifold 500 is directed to flow back into a return path of thermal control circuit 250. In further addition, fluid manifold 500 distributes thermal transfer fluid at temperature $T_1$ to each of thermal heads $620_1$-$620_4$ in the array, thereby bringing each of DUTs $600_1$-$600_4$ that are in contact with each of thermal heads $620_1$-$620_4$ to temperature $T_1$. Fluid flow in switch block 400 is controlled by pneumatically-actuated, fluidic switches that include fluid valves (not shown in FIG. 3 for ease of understanding the operating principles of fluid switch block 400) that are activated by applying compressed air thereto. The compressed air applied to each fluid valve is turned on or off by use of solenoid-actuated, pneumatic valves. The solenoids are controlled, in turn, by electrical currents supplied to the solenoids for each of the pneumatic valves at an appropriate time by an activation controller (to be described in detail below).

In accordance with one or more embodiments of the present invention, fluid switch block 400 is activated to a second state (state 2) that causes it: (a) to block the flow of thermal transfer fluid to and from fluid manifold 500 from thermal control circuits 250 and 270 by shunting thermal transfer fluid output therefrom (which flows into intakes of fluid switch block 400) to exhausts of fluid switch block 400 and back into thermal control circuits 250 and 270, respectively (without the thermal transfer fluid from thermal control circuits 250 and 270 being routed to fluid manifold 500); and (b) to direct thermal transfer fluid at temperature $T_2$ flowing in thermal control loop 260 to flow to fluid manifold 500 rather than continuing to flow to a return path into thermal control circuit 260. In addition, thermal transfer fluid received by fluid switch block 400 from fluid manifold 500 is directed to flow back into a return path of thermal control loop 260. In further addition, fluid manifold 500 distributes thermal transfer fluid at temperature $T_2$ to each of thermal heads $620_1$-$620_4$ in the array, thereby bringing each of DUTs $600_1$-$600_4$ that are in contact with each of thermal heads $620_1$-$620_4$ to temperature $T_2$.

In accordance with one or more embodiments of the present invention, fluid switch block 400 is activated to a third state (state 3) that causes it: (a) to block the flow of thermal transfer fluid to and from fluid manifold 500 from thermal control circuits 250 and 260 by shunting thermal transfer fluid output therefrom (which flows into intakes of fluid switch block 400) to exhausts of fluid switch block 400 and back into thermal control circuits 250 and 260, respectively (without the thermal transfer fluid from thermal control circuits 250 and 260 being routed to fluid manifold 500); and (b) to direct thermal transfer fluid at temperature $T_3$ flowing in thermal control circuit 270 to flow to fluid manifold 500 rather than continuing to flow to a return path into thermal control circuit 270. In addition, thermal transfer fluid received by fluid switch block 400 from fluid manifold 500 is directed to flow back into a return path of thermal control circuit 270. In further addition, fluid manifold 500 distributes thermal transfer fluid at temperature $T_3$ to each of thermal heads $620_1$-$620_4$ in the array, thereby bringing each of DUTs $600_1$-$600_4$ that are in contact with each of thermal heads $620_1$-$620_4$ to temperature $T_3$.

Figure 4:
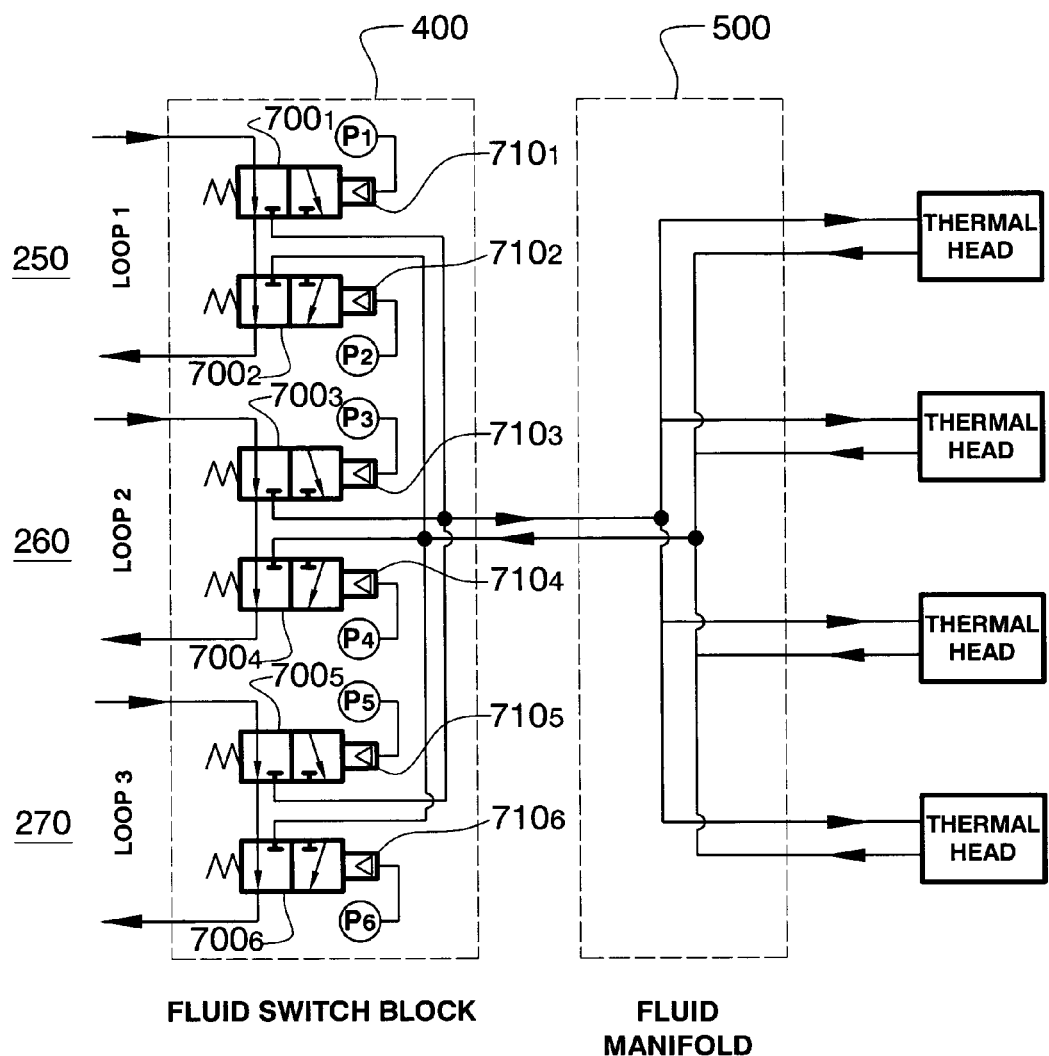
FIG. 4 is a schematic diagram of an embodiment of a fluid switch block and a fluid manifold for the temperature set and control apparatus shown in FIG. 3.

FIG. 4 is a schematic diagram of an embodiment of fluid switch block 400 and fluid manifold 500 for temperature set and control apparatus 2000 shown in FIG. 3. In accordance with one or more embodiments of the present invention, and as shown in FIG. 4, the flow of thermal transfer fluid in fluid switch block 400 is directed by three pairs of fluidic switches (pair of switches $700_1$ and $700_2$, pair of switches $700_3$ and $700_4$, and pair of switches $700_5$ and $700_6$) disposed in each of thermal control circuits 250, 260, and 270, respectively. In accordance with one or more embodiments of the present invention, each of fluidic switches $700_1$, $700_2$, $700_3$, $700_4$, $700_5$, and $700_6$ is a pneumatically-actuated, fluidic switch which is activated by compressed air at a pressure supplied by pneumatic circuits (not shown for reasons of clarity and to enable the operation of the embodiments to be better understood). In particular, as shown in FIG. 4, and in accordance with one or more embodiments of the present invention, on entering fluid switch block 400: (a) thermal transfer fluid in thermal control circuit 250 is directed (for example, and without limitation, by channels) to intake fluidic switch $700_1$ that is able to switch the flow of thermal transfer fluid (under control of pressure P1 applied to pneumatic valve $710_1$): (i) to fluid manifold 500 or (ii) to exhaust fluidic switch $700_2$; (b) thermal transfer fluid in thermal control circuit 260 is directed (for example, and without limitation, by channels) to intake fluidic switch $700_3$ that is able to switch the flow of thermal transfer fluid (under control of pressure P3 applied to pneumatic valve $710_3$): (i) to fluid manifold 500 or (ii) to exhaust fluidic switch $700_4$; and (c) thermal transfer fluid in thermal control circuit 270 is directed (for example, and without limitation, by channels) to intake fluidic switch $700_5$ that is able to switch the flow of thermal transfer fluid (under control of pressure P5 applied to pneumatic valve $710_5$): (i) to fluid manifold 500 or (ii) to exhaust fluidic switch $700_6$. Further, as shown in FIG. 4, and in accordance with one or more embodiments of the present invention: (a) exhaust fluidic switch $700_2$ is connected to receive a flow of thermal transfer fluid (under control of pressure P2 applied to pneumatic valve $710_2$): (i) from fluid manifold 500 or (ii) from intake fluidic switch $700_1$, and to direct a flow of thermal transfer fluid back into thermal control circuit 250 and out of fluid switch block 400; (b) exhaust fluidic switch $700_4$ is connected to receive a flow of thermal transfer fluid (under control of pressure P4 applied to pneumatic valve $710_4$): (i) from fluid manifold 500 or (ii) from intake fluidic switch $700_3$, and to direct a flow of thermal transfer fluid back into thermal control circuit 260 and out of fluid switch block 400; and (c) exhaust fluidic switch $700_6$ is connected to receive a flow of thermal transfer fluid (under control of pressure P6 applied to pneumatic valve $710_6$): (i) from fluid manifold 500 or (ii) from intake fluidic switch $700_5$, and to direct a flow of thermal transfer fluid back into thermal control circuit 270 and out of fluid switch block 400. Preferably, the intake and the exhaust fluidic switches of a switch pair in each thermal control circuit are activated at approximately the same time, for example and without limitation, within 0 to 100 milliseconds of each other, thereby enabling a continuous flow of thermal transfer fluid in a thermal control circuit: (a) from an intake fluidic switch to an exhaust fluidic switch and out of fluid switch block 400; or (b) from an intake fluidic switch to fluid manifold 500 and then back to an exhaust fluidic switch where it is directed out of fluid switch block 400. The fluidic switches $700_1$ and $700_2$ are activated by applying compressed air thereto. Further, compressed air applied to each of the fluidic switches is switched on or off using solenoid-actuated, pneumatic valves, not shown for ease of understanding the operating principles of fluid switch block 400. The timing of activation of each pneumatically-actuated, fluidic switch is determined by an activation controller that supplies electrical current to each of the solenoids for each of the pneumatic valves.

FIGS. 5A, 5B, 5C, and 5D are schematic representations of fluid switch block 400 shown in FIG. 3 illustrating the flow of thermal transfer fluid in a quiescent state and in state 1, state 2, and state 3, respectively, of operation. FIG. 5E is a timing diagram showing pneumatic valve activation pressures $P_1$, $P_2$, $P_3$, $P_4$, $P_5$, and $P_6$ applied to fluidic switches $700_1$, $700_2$, $700_3$, $700_4$, $700_5$, and $700_6$, respectively, of fluid switch block 400 shown in FIG. 3, together with temperature of the thermal transfer fluid output from fluid switch block 400. As one can appreciate from FIG. 5E, the temperature of the thermal transfer fluid output from fluid switch block 400 in a quiescent state is a predetermined temperature that is lower than $T_1$, $T_2$, and $T_3$.

Figures 5A, 5B, 5C, 5D:
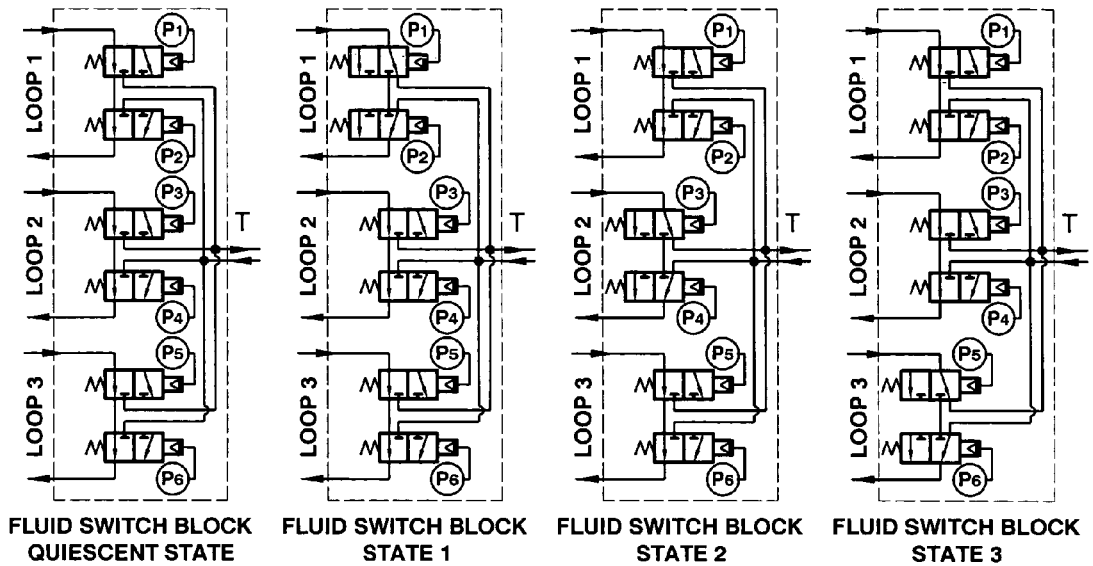
FIGS. 5A, 5B, 5C, and 5D are schematic representations of the fluid switch block shown in FIG. 3 illustrating the flow of thermal transfer fluid in a quiescent state and in state 1, state 2, and state 3, respectively, of operation.
Figure 5E:
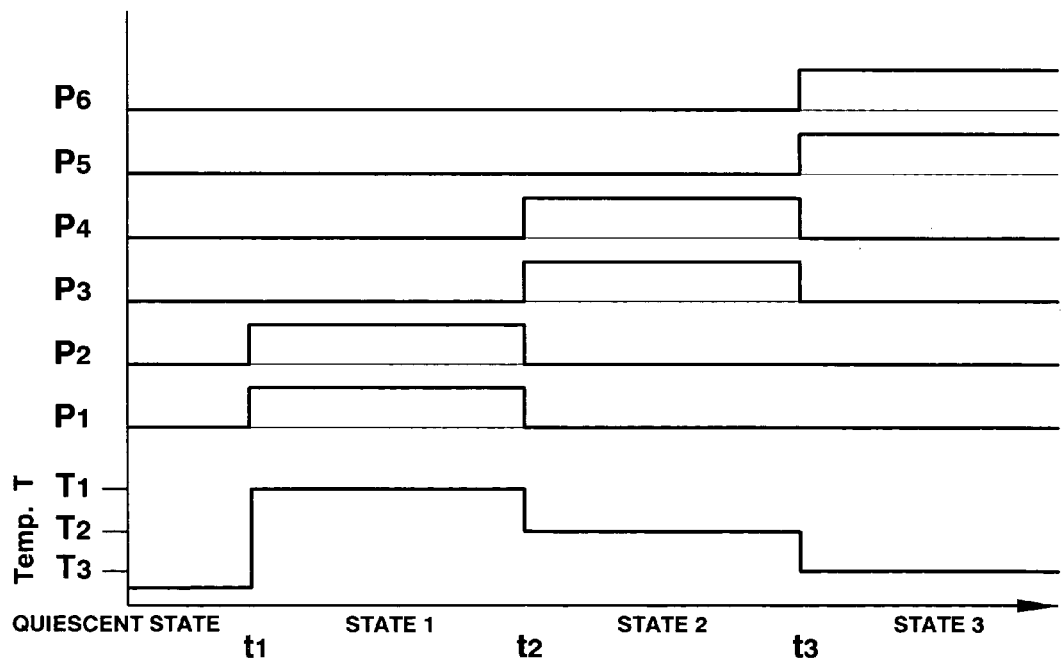
FIG. 5E is a timing diagram showing pneumatic activation pressures applied to each of six valves of the fluid switch block shown in FIG. 3 together with temperature of thermal transfer fluid output from a fluid switch block.

As shown in FIG. 5A, in the quiescent state, pneumatic valve activation pressures $P_1$, $P_2$, $P_3$, $P_4$, $P_5$, and $P_6$ have the same value, and thermal transfer fluid flows in each of temperature control circuits 250, 260, and 270 without flowing (out of fluid switch block 400 and) through fluid manifold 500. At time $t_1$ (as indicated in FIG. 5E), fluid switch block 400 is activated to state 1 ($P_1$ and $P_2$ values are increased) wherein thermal transfer fluid from thermal control circuit 250 is directed to flow (out of fluid switch block 400 and) through fluid manifold 500 and then back into thermal control circuit 250—as shown in detail in FIG. 5B—while thermal transfer fluid flows in each of temperature control circuits 260, and 270 without flowing through fluid manifold 500. As one can readily appreciate from FIG. 5E, the temperature of the thermal transfer fluid output from fluid switch block 400 rises to a first control temperature $T_1$ (i.e., the temperature of thermal control circuit 250). At time $t_2$ (as indicated in FIG. 5E), fluid switch block 400 is activated to state 2 ($P_1$ and $P_2$ values are decreased and $P_3$ and $P_4$ values are increased) wherein: (a) thermal transfer fluid from thermal control circuit 250 is shunted back into thermal control circuit 250 without flowing through fluid manifold 500; and (b) thermal transfer fluid in thermal control circuit 260 is directed to flow (out of fluid switch block 400 and) through fluid manifold 500 and then back into thermal control circuit 260—as shown in detail in FIG. 5C. As one can readily appreciate from FIG. 5E, upon entering state 2 at time $t_2$, the temperature output from fluid switch block 400 falls to a second control temperature $T_2$ (i.e., the temperature of thermal control circuit 260). At time $t_3$ (as indicated in FIG. 5E), fluid switch block 400 is activated to state 3 ($P_3$ and $P_4$ values are decreased and $P_5$ and $P_6$ values are increased) wherein: (a) thermal transfer fluid from thermal control circuit 260 is shunted back into thermal control circuit 260 without flowing through fluid manifold 500; and (b) thermal transfer fluid in thermal control circuit 270 is directed to flow (out of fluid switch block 400 and) through fluid manifold 500 and then back into thermal control circuit 270—as shown in detail in FIG. 5D. As one can readily appreciate from FIG. 5E, upon entering state 3 at time $t_3$, the temperature output from fluid switch block 400 falls to a third control temperature $T_3$ (i.e., the temperature of thermal control circuit 270). After carrying out a test sequence in accordance with any one of a number of methods that are well known to those of ordinary skill in the art, temperature set and control apparatus 2000 may be returned to the quiescent state by decreasing each of $P_1$, $P_2$, $P_3$, $P_4$, $P_5$, and $P_6$, whereby thermal transfer fluid in each of thermal control circuits 250, 260, and 270 flows without passing out of fluid switch block 400 to fluid manifold 500.

As one can readily appreciate from the above, temperature set and control apparatus 2000 shown in FIG. 3 is an embodiment of the present invention that may be used for testing electronic devices by providing a mechanism for changing the temperature of a device being tested ("DUT") rapidly. As described above, a thermal transfer fluid flows through channels in a thermal head in thermal contact with the DUT. A fluid manifold is connected to the channels in the thermal head so that the thermal transfer fluid is conveyed from the fluid manifold to the thermal head. In accordance with one or more embodiments of the present invention, heat transfer by thermal conduction brings the temperature of the thermal head and the DUT in thermal contact with it to the temperature of the thermal transfer fluid flowing through the thermal head.

In accordance with one or more embodiments of the present invention, thermal transfer fluid flows in several thermal control circuits simultaneously, the thermal transfer fluid in each thermal control circuit being at a predetermined temperature. Further, the temperature of the thermal transfer fluid in a thermal control circuit is maintained using any one of a number of methods that are well known to those of ordinary skill in the art such as, for example and without limitation, using a heat exchanger, a chiller, a resistive heating element, or other means known in the art.

In accordance with one or more embodiments of the present invention, in each thermal control circuit, the thermal transfer fluid flows through a sequence of two fluidic switches, wherein an intake fluidic switch directs a flow of the thermal transfer fluid either to the thermal head or to an exhaust fluidic switch. In addition, in accordance with one or more embodiments of the present invention, the flow of thermal transfer fluid in each thermal control circuit is maintained without a significant interruption of the flow of thermal transfer fluid in the thermal control circuit.

In accordance with one or more embodiments of the present invention, operation of the intake and the exhaust fluidic switches in a thermal control circuit enables the flow of thermal transfer fluid in that thermal control circuit to be switched rapidly from an initial state wherein thermal transfer fluid flows from the first or intake fluidic switch directly to the second or exhaust fluidic switch without circulating through the thermal head, to a subsequent state wherein thermal transfer fluid flows from the first or intake fluidic switch to the thermal head. In accordance with one or more embodiments of the present invention, the fluidic switches can be pneumatically-actuated, poppet valves; solenoid actuated, fluidic switches; or other fluidic switches as known in the art.

In particular, in accordance with one or more embodiments of the present invention, in an initial state, thermal transfer fluid at a first temperature in a first thermal control circuit (loop 1) flows from a first intake fluidic switch directly to a second exhaust fluidic switch without going through the thermal head, and thermal transfer fluid at a second temperature in a second thermal control circuit (loop 2) flows from a first intake fluidic switch directly to a second exhaust fluidic switch without going through the thermal head. In a subsequent state, thermal transfer fluid at the first temperature in loop 1 flows from the first intake fluidic switch of loop 1 to the thermal head, and then to the first exhaust fluidic switch of loop 1. Also, in the subsequent state, thermal transfer fluid in loop 2 at the second temperature flows from the first intake fluidic switch of loop 2 directly to the second exhaust fluidic switch of loop 2 without going through the thermal head. In this way, the temperature of a device in thermal contact with the thermal head is brought rapidly to the first temperature. In a further subsequent state, thermal transfer fluid at the second temperature in loop 2 flows from the first intake fluidic switch of loop 2 to the thermal head and then to the first exhaust fluidic switch of loop 2. Also, in the further subsequent state, thermal transfer fluid in loop 1 at the first temperature flows from the first intake fluidic switch of loop 1 directly to the second exhaust fluidic switch of loop 1 without going through the thermal head. In this way, the temperature of the device in thermal contact with the thermal head is brought rapidly from the first temperature to the second temperature.

In order that the temperature of a device be changed rapidly, in accordance with one or more embodiments of the present invention, the intake fluidic switch and the exhaust fluidic switch in each thermal control circuit is positioned close to the thermal head. Further, in accordance with one or more embodiments of the present invention, each pair of intake and exhaust fluidic switches is mounted on a manifold having a plurality of channels for directing thermal transfer fluid flow within the manifold. Also, in accordance with one or more such embodiments of the present invention, the manifold is positioned in close proximity to the thermal head so that the fluid path from the manifold to the thermal head is short, thereby enabling a rapid temperature change of the thermal head. The distance from the first intake fluidic switch to the thermal head is preferably less than 50 cm, and more preferably less than 10 cm.

In accordance with one or more further embodiments of the present invention, a temperature set and control apparatus enables testing an electronic device at three different temperatures, in rapid succession. In accordance with one or more such embodiments of the present invention, three thermal control circuits of thermal transfer fluid flow are provided, in which thermal transfer fluid in each thermal control circuit is maintained at a predetermined temperature in that thermal control circuit by a heat exchanger—thermal transfer fluid in a first thermal control circuit is at a first temperature, thermal transfer fluid in a second thermal control circuit is at a second temperature, and thermal transfer fluid in a third thermal control circuit is at a third temperature. Thermal transfer fluid flowing through each heat exchanger is brought to temperature by exchange of heat with, for example and without limitation, liquid flowing from a chiller through the heat exchanger—operation of chillers in establishing temperature in a liquid is well known to those of ordinary skill in the art in the semiconductor industry. Temperature in each thermal control circuit may be determined, for example, and without limitation, at a point where thermal transfer fluid in that thermal control circuit passes through an intake fluidic switch. In accordance with one or more embodiments of the present invention, thermal transfer fluid flows substantially continuously in each of the three thermal control circuits, notwithstanding any momentary transient disturbance of flow associated with fluidic switching processes. In a quiescent state, thermal transfer fluid in each thermal control circuit flows from an intake fluidic switch directly to an exhaust fluidic switch, the fluidic switches being mounted on a fluid switch block.

In a first test state, a device (for example and without limitation, an electronic device) in contact with a thermal head is brought to a temperature related to the first temperature of the thermal transfer fluid flowing in the first thermal control circuit. The first test state is initiated by activating a first intake switch and a first exhaust fluidic switch in the first thermal control circuit. In the activated state, the first intake fluidic switch directs flow of thermal transfer fluid in the first thermal control circuit through a channel in a manifold to the thermal head. Thermal transfer fluid flows through the thermal head and flows out through a channel in the manifold to the first exhaust fluidic switch. In the activated state, the first exhaust fluidic switch directs flow of thermal transfer fluid from the thermal head back into the first thermal control circuit and away from the fluid switch block. In the first test state, testing is carried out using any one of a number of testing methods that are well known to those of ordinary skill in the art such as, for example and without limitation, digital signal testing, boundary scan testing, mixed signal testing, optical circuit testing, micromechanical tests, sensor testing, reliability cycling testing and/or any one of a number of test procedures commonly used in the microelectronics industry. The first test state is ended by deactivating the first intake fluidic switch and the first exhaust fluidic switch to stop thermal transfer fluid in the first thermal control circuit from flowing through the thermal head. When the first test state is ended, thermal transfer fluid in the first thermal control circuit flows from the first intake fluidic switch directly to the first exhaust fluidic switch without flowing through the thermal head. During the first test state, thermal transfer fluids in the second and third thermal control circuits flow therein without flowing through the thermal head.

In a second test state, the device in contact with the thermal head is brought to a temperature related to the second temperature of the thermal transfer fluid flowing in the second thermal control circuit. The second test state is initiated by activating a second intake fluidic switch and a second exhaust fluidic switch in the second thermal control circuit. In an activated state, the second intake fluidic switch directs flow of thermal transfer fluid in the second thermal control circuit through a channel in the manifold to the thermal head. Thermal transfer fluid flows through the thermal head and flows out through a channel in the manifold to the second exhaust fluidic switch. In the activated state, the second exhaust fluidic switch directs flow of thermal transfer fluid from the thermal head back into the second thermal control circuit and away from the fluid switch block. In the second test state, testing is carried out using any one of a number of testing methods that are well known to those of ordinary skill in the art such as, for example and without limitation, digital signal testing, boundary scan testing, mixed signal testing, optical circuit testing, micromechanical tests, sensor testing, reliability cycling testing and/or any one of a number of test procedures commonly used in the microelectronics industry. The second test state is ended by deactivating the second intake fluidic switch and the second exhaust fluidic switch to stop thermal transfer fluid in the second thermal control circuit from flowing through the thermal head. When the second test state is ended, thermal transfer fluid in the second thermal control circuit flows from the second intake fluidic switch directly to the second exhaust fluidic switch without flowing through the thermal head. During the second test state, thermal transfer fluid in the first and third thermal control circuits flow therein without flowing through the thermal head.

In a third test state, the device in contact with the thermal head is brought to a temperature related to the third temperature of the thermal transfer fluid flowing in the third thermal control circuit. The third test state is initiated by activating a third intake fluidic switch and a third exhaust fluidic switch in the third thermal control circuit. In an activated state, the third intake fluidic switch directs flow of thermal transfer fluid in the third thermal control circuit through a channel in the manifold to the thermal head. Thermal transfer fluid flows through the thermal head and flows out through a channel in the manifold to the third exhaust fluidic switch. In the activated state, the third exhaust fluidic switch directs flow of thermal transfer fluid from the thermal head back into the third thermal control circuit and away from the fluid switch block. In the third test state, testing is carried out using any one of a number of testing methods that are well known to those of ordinary skill in the art such as, for example and without limitation, digital signal testing, boundary scan testing, mixed signal testing, optical circuit testing, micromechanical tests, sensor testing, reliability cycling testing and/or any one of a number of test procedures commonly used in the microelectronics industry. The third test state is ended by deactivating the third intake fluidic switch and the third exhaust fluidic switch to stop thermal transfer fluid in the third thermal control circuit from flowing through the thermal head. When the third test state is ended, thermal transfer fluid in the third thermal control circuit flows from the third intake fluidic switch directly to the third exhaust fluidic switch without flowing through the thermal head. During the third test state, thermal transfer fluid in the first and second thermal control circuits flow therein without flowing through the thermal head.

Figure 6A:
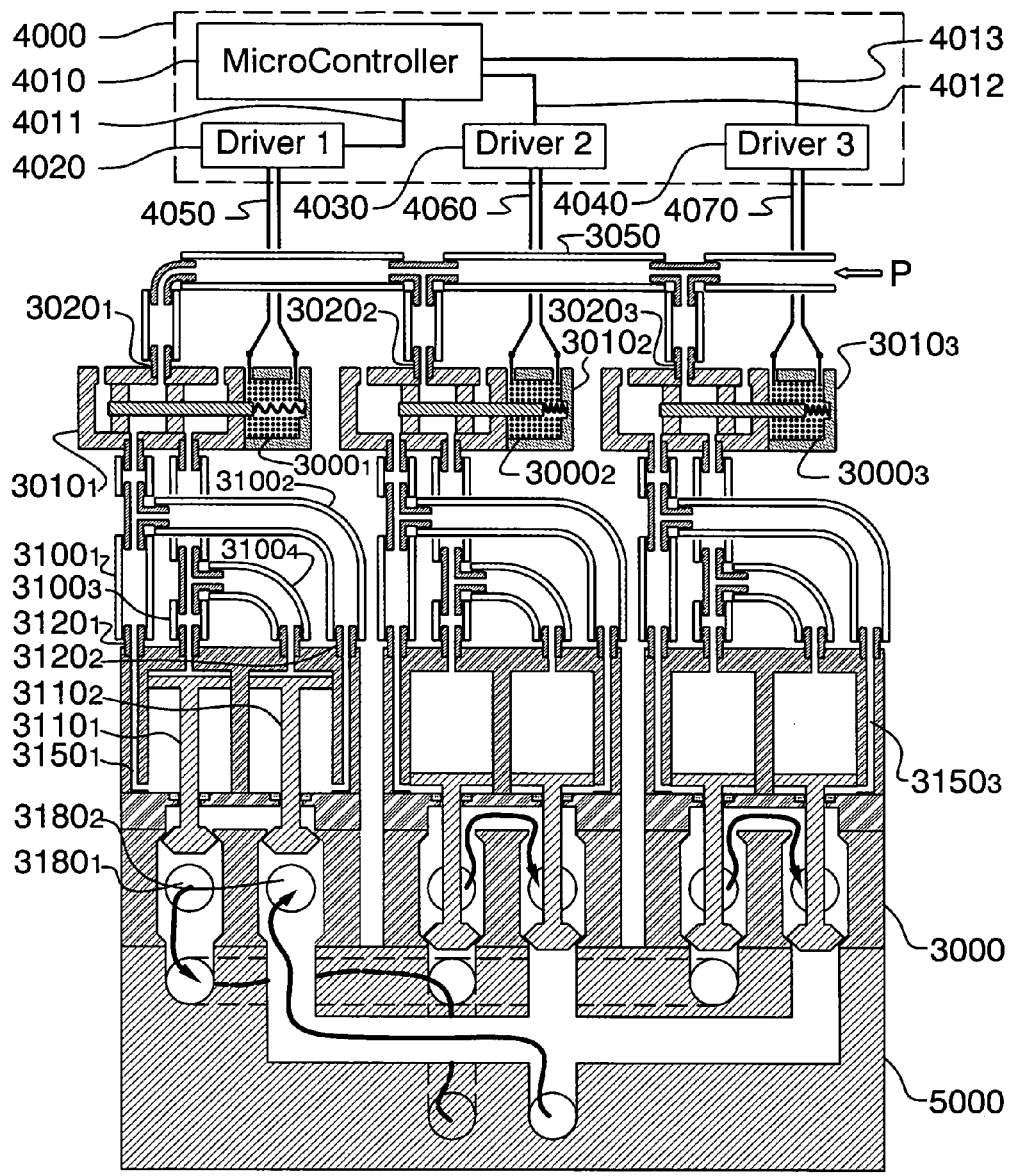
FIG. 6A is a partial cross sectional view of a fluid switch block (fabricated in accordance with one or more embodiments of the present invention)—and an embodiment of the fluid switch block shown in FIG. 4, along with a block diagram of an activation controller (fabricated in accordance with one or more embodiments of the present invention) useful to control operation of the fluid switch block (and hence the fluid switch block shown in FIG. 4), wherein the fluid switch block is in state 1.

FIG. 6A is a partial cross sectional view of fluid switch block 3000—an embodiment of fluid switch block 400 shown in FIG. 4—(fluid switch block 3000 is fabricated in accordance with one or more embodiments of the present invention), along with a block diagram of activation controller 4000—an embodiment of an activation controller useful to control operation of fluid switch block 3000 (and hence fluid switch block 400 shown in FIG. 4—(control circuitry 4000 is fabricated in accordance with one or more embodiments of the present invention). In FIG. 6A, activation controller 4000 has operated to place fluid switch block 3000 in state 1. In accordance with one or more embodiments of the present invention, and as has been described above, in state 1, thermal transfer fluid in a first thermal control circuit flows through a thermal head while thermal transfer fluids in second and third thermal control circuits flow continuously without flowing through the thermal head.

As shown in FIG. 6A, activation controller 400 is an electronic control circuit that controls operation of fluid switch block 3000. As shown in FIG. 6A, activation controller 4000 includes microcontroller 4010 which may be any one of a number of microcontrollers that are well known to those of ordinary skill in the art. Microcontroller 4010 is typically programmed in accordance with any one of a number of methods by one of ordinary skill in the art routinely and without undue experimentation to control the operation of drivers 4020, 4030, and 4040. Drivers 4020, 4030, and 4040 may be any one of a number of driver circuits that are well known to those of ordinary skill in the art that provide electrical drive signals over leads 4050, 4060, and 4070, respectively, in response to control signals provided by microcontroller 4010 over lines 4011, 4012, and 4013, respectively. The drive signals are applied as input to solenoids $3000_1$, $3000_2$, and $3000_3$ of solenoid-actuated, four-way, five-port pneumatic valves $3010_1$, $3010_2$, and $3010_3$, respectively, such as the Clippard model number R-441 available from Clippard Instrument Company, Inc., of Cincinnati, Ohio.

As further shown in FIG. 6A, compressed air at pressure P is supplied as input to intakes $3020_1$, $3020_2$, and $3020_3$, of pneumatic valves $3010_1$, $3010_2$, and $3010_3$, respectively, by manifold 3050. The compressed air may be supplied by a compressed air source in accordance with any one of a number of methods that are well known to those of ordinary skill in the art. As still further shown in FIG. 6A, each of pneumatic valves $3010_1$, $3010_2$, and $3010_3$ include a poppet valve that is connected to a restoration spring. Then: (a) whenever a solenoid is activated, it draws the poppet valve to the right and compresses the restoration spring; and (b) whenever a solenoid is deactivated, the restoration spring urges the poppet valve to the left. In this manner, as will be described below, pneumatic valves $3010_1$, $3010_2$, and $3010_3$ direct the action of the poppet valves, which, in turn, direct the compressed air to control corresponding fluid valves $3150_1$, $3150_2$, and $3150_3$. As a result, fluid valves $3150_1$, $3150_2$, and $3150_3$ direct the flow of thermal transfer fluid in each of the three thermal control circuits.

As shown in FIG. 6A, in state 1, solenoids $3000_2$ and $3000_3$ in pneumatic valves $3010_2$ and $3010_3$, respectively, are activated by current from corresponding drivers 4030 and 4040. As further shown in FIG. 6A, pneumatic valve $3010_1$ is in a quiescent state in which a restoration spring urges a poppet valve leftward, thereby allowing compressed air in manifold 3050 to flow therefrom, through channels 3100$_1$ and 3100$_2$, to actuation inlets 3120$_1$, and 3120$_2$ of fluid valve 3150$_1$. The compressed air applied to actuation inlets 3120$_1$ and 3120$_2$ of fluid valve 3150$_1$ urges pistons and attached poppet valves 3110$_1$ and 3110$_2$ in fluid valve 3150$_1$ upward in fluid valve 3150$_1$, thereby opening intake port 3180$_1$ and exhaust port 3180$_2$ in fluid valve 3150$_1$. As a consequence, thermal transfer fluid flows through intake port 3128$_1$, through a channel in fluid switching block 3000, and out of fluid switch block 3000 toward the thermal head. Next, thermal transfer fluid from the thermal head flows back into a channel in fluid switching block 3000 and out through exhaust port 3180$_2$ in fluid valve 3160. Air in fluid valve 3150$_1$ flows through outlets 3120$_3$ and 3120$_4$ of fluid valve 3150, and is released from pneumatic valve 3010$_1$ through exhaust ports thereof.

As still further shown in FIG. 6A, in state 1, compressed air is directed by pneumatic valves 3010$_2$ and 3010$_3$ into outlets of fluid valves 3150$_2$ and 3150$_3$, thereby urging pistons and connected poppet valves thereof downward, and any air forced from inlets of fluid valves 3150$_2$ and 3150$_3$ is relieved by passing out through exhaust ports in pneumatic valves 3010$_2$ and 3010$_3$. Poppet valves in fluid valves 3150$_2$ and 3150$_3$ close off channels to and from the thermal head while opening a shunt path from an intake port to an exhaust port of each of fluid valves 3150$_2$ and 3150$_3$. As one can readily appreciate from FIG. 6A, thermal transfer fluid in each of thermal control circuits 1, 2, and 3 flows continuously, although only thermal transfer fluid in thermal control circuit 1 is routed through the thermal head. Thermal transfer fluid in thermal control circuits 2 and 3 is shunted from intake to exhaust ports of the respective fluid valves.

Figure 6B:
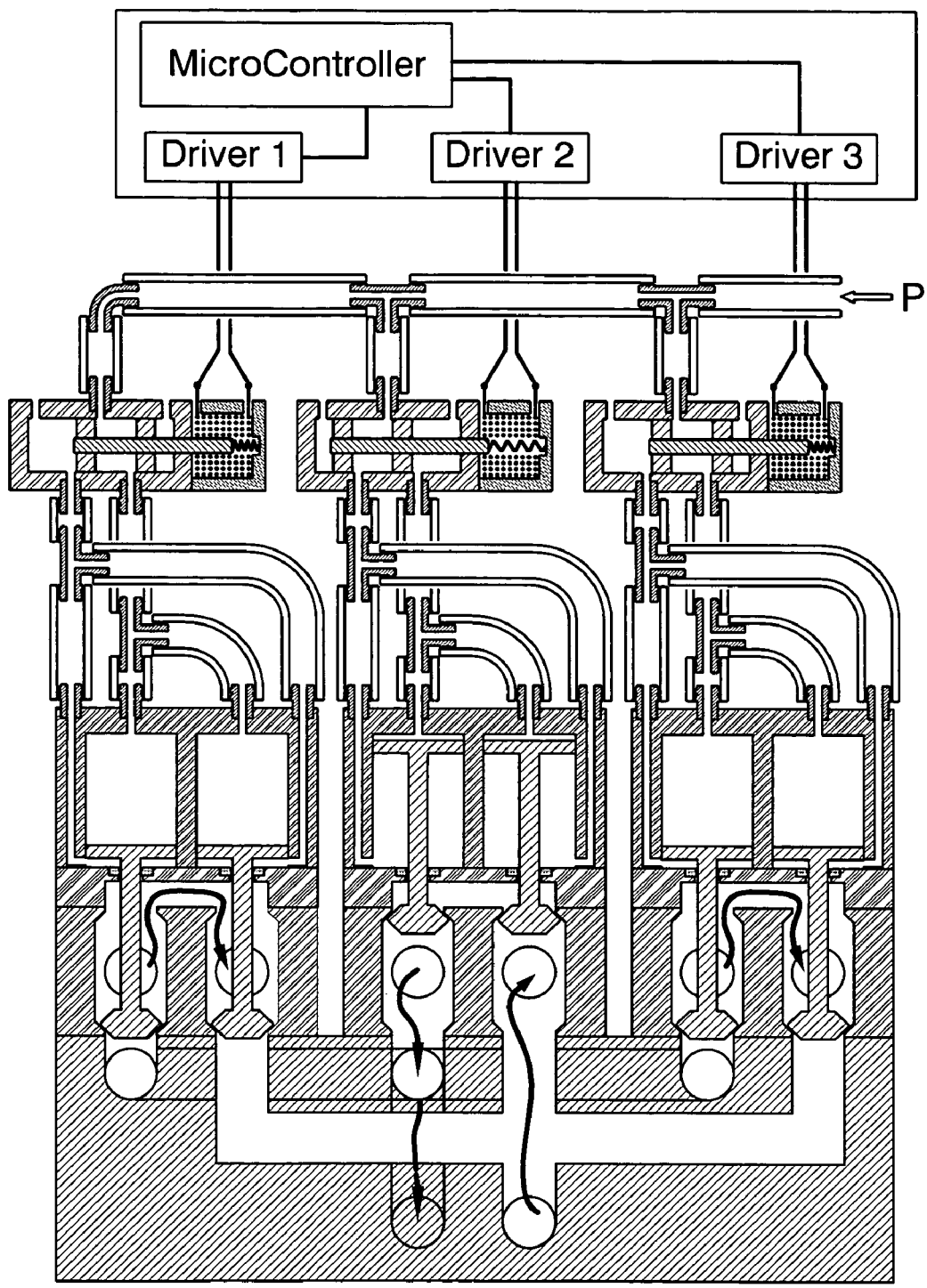
FIG. 6B is a partial cross sectional view of the fluid switch block shown in FIG. 6A along with a block diagram of the activation controller shown in FIG. 6A, wherein the fluid switch block is in state 2.

FIG. 6B is a partial cross sectional view of fluid switch block 3000 shown in FIG. 6A, along with a block diagram of activation controller 4000 shown in FIG. 6A, wherein fluid switch block 3000 is in state 2. In state 2, thermal transfer fluid in a second thermal control circuit flows through the thermal head while thermal transfer fluids in a first and a third thermal control circuit circulate continuously without flowing through the thermal head. As such, and in accordance with this embodiment of the present invention, solenoids 3000$_1$ and 3000$_3$ in pneumatic valves 3010$_1$ and 3010$_3$ are actuated by current from corresponding drivers 4020 and 4040. Pneumatic valve 3010$_2$ is left in the quiescent state in which the restoration spring urges the poppet valve leftward, thereby allowing compressed air to flow from manifold 3050 to actuation inlets of fluid valve 3150$_2$. Air in fluid valve 3150$_2$ flows through outlets of fluid valve 3150$_2$, and is released from pneumatic valve 3010$_2$ through exhaust ports thereof.

Compressed air in the inlets of fluid valve 3150$_2$ urges pistons and attached poppet valves upward in fluid valve 3150$_2$, thereby opening intake and exhaust ports in fluid valve 3150$_2$. As a consequence, thermal transfer fluid from the second thermal control circuit then flows through the intake port, through a channel in fluid switching block 3000, and out of fluid switch block 3000 toward the thermal head. Next, thermal transfer fluid from the thermal head flows back into a channel in fluid switching block 3000 and out through an exhaust port in fluid valve 3150$_2$ and back into the second thermal control circuit.

As further shown in FIG. 6B, in state 2, compressed air from manifold 3050 is directed by pneumatic valves 3010$_1$ and 3010$_3$, into outlets of fluid valves 3150$_1$ and 3150$_3$, thereby urging pistons and connected poppet valves in these fluid valves downward, and any air forced from inlets of fluid valves 3150 and 3150$_3$ is relieved by passing out through exhaust ports in pneumatic valves 3010$_1$ and 3010$_3$. Poppet valves in fluid valves 3150$_1$ and 3150$_3$ close off channels to and from the thermal head while opening a shunt path from an intake port to an exhaust port of each of fluid valves 3150$_1$ and 3150$_3$. As one can readily appreciate from FIG. 6B, thermal transfer fluid in each of thermal control circuits 1, 2, and 3 flows continuously, although only thermal transfer fluid in thermal control circuit 2 is routed through the thermal head. Thermal transfer fluid in thermal control circuits 1 and 3 is shunted from intake to exhaust ports of the respective fluid valves. Thus, by reference to FIGS. 6A and 6B, one can readily appreciate that thermal transfer fluid in each of the three thermal control circuits continues to flow substantially at all times, regardless of the state of fluid switch block 3000 that directs any one of the thermal transfer fluids through the thermal head.

As was described above, in fabricating one or more embodiments of the present invention, one may utilize a heat transfer apparatus that is a thermal head (described above) wherein a thermal transfer fluid flows through the thermal head and, to effectuate heat transfer, a device is brought into thermal contact with the thermal head. It should be understood by one of ordinary skill in the art that the term thermal contact refers to contact between a first and a second constituent whereby heat may be transferred therebetween primarily by conduction, even indirectly (i.e., by conduction through intermediary materials). However, in fabricating one or more further embodiments of the present invention, one may utilize a heat transfer apparatus that comprises a structure which includes a chamber (for example and without limitation, a test chamber), which chamber is suitable to contain the device or a portion of the device, and which structure may further include conduit(s) to and/or from the chamber, wherein thermal transfer fluid flows through the chamber (and conduits). In accordance with one or more such embodiments, the thermal transfer fluid may come into thermal contact (for example and without limitation, direct contact) with the device or a portion of the device. Further, in accordance with one or more such embodiments, the chamber may be a vacuum tight sealed chamber. Still further, in accordance with one or more such embodiments, the thermal transfer fluid may be, in addition to any other thermal transfer fluid described herein, for example, and without limitation, helium, helium mixtures, nitrogen, carbon dioxide, hydrogen, mixtures of the foregoing, or an inert gas or gases other than helium.

Embodiments have been described above for setting and controlling the temperature of a device under test ("DUT") wherein the device under test is functionally tested by automatic test equipment, and wherein the DUT is, for example and without limitation, a packaged integrated circuit ("IC") device or a die of a semiconductor wafer. However, it should be understood by those of ordinary skill in the art that temperature set and control method and apparatus fabricated in accordance with the present invention may apply in a variety of different fields, applications, industries, and technologies. As such, one or more embodiments of the present invention can be used with any system in which temperature is either set and/or controlled. This includes many different processes and applications involved in semiconductor fabrication, testing, and operation. Further, the temperature of interest may be that of any physical entity, including, for example and without limitation, an electronic device or its environment (such as air molecules), either in a flow or stationary.

Embodiments of the present invention described above are exemplary. As such, many changes and modifications may be made to the disclosure set forth above while remaining within the scope of the invention. In addition, materials, methods, and mechanisms suitable for fabricating embodiments of the present invention have been described above by providing specific, non-limiting examples and/or by relying on the knowledge of one of ordinary skill in the art. Materials, methods, and mechanisms suitable for fabricating various embodiments or portions of various embodiments of the present invention described above have not been repeated, for sake of brevity, wherever it should be well understood by those of ordinary skill in the art that the various embodiments or portions of the various embodiments could be fabricated utilizing the same or similar previously described materials, methods or mechanisms.

Further, although embodiments of the present invention were described wherein the thermal transfer fluid was the same in each of the thermal control loops, it should be understood by one of ordinary skill in the art that further embodiments exist wherein the thermal transfer fluid may be different in some or all of the thermal control loops.

Further, in light of the description above, it should be understood by those of ordinary skill in the art that: (a) embodiments of the present invention exist wherein thermal transfer fluid may be directed: (i) from a fluidic switch to a manifold or manifold structure and then to a thermal head or chamber, and (ii) from the thermal head or chamber to the manifold and then to a fluidic switch; and (b) further embodiments of the present invention exist wherein thermal transfer fluid may be directed: (i) from a fluidic switch to a thermal head or chamber, and (ii) from the thermal head or chamber to a fluidic switch without an interposed manifold or manifold structure.

Further, although embodiments of the present invention were described wherein a thermal head was utilized, it should be understood by one of ordinary skill in the art that the term thermal head may include thermal heads whose purpose is not only to regulate the temperature of a device under test but to include apparatus for carrying out any one of a number of tests that are well known to those of ordinary skill in the art.

In accordance with one or more embodiments of the present invention, electrical circuits, using analog components, digital components, or a combination may be used to implement control, processing, and interface functions described herein. In addition, in accordance with one or more such embodiments, software implementations can be written in any suitable language, including without limitation high-level programming languages such as C+, mid-level and low-level languages, assembly languages, application-specific or device-specific languages, and graphical languages. In further addition, such software can run on a general purpose computer such as a Pentium, an application specific pieces of hardware, or other suitable devices. In addition to using discrete hardware components in a logic circuit, the logic may also be performed by an application specific integrated circuit ("ASIC") or other device. In further addition, various embodiments will also include hardware components which are well known to those of ordinary skill in the art such as, for example and without limitation, connectors, cables, and the like. Moreover, at least part of this functionality may be embodied in computer readable media (also referred to as computer program products) such as, for example and without limitation, magnetic, magnetic-optical, and optical media, used in programming an information-processing apparatus to perform in accordance with one or more embodiments of the present invention. This functionality also may be embodied in computer readable media, or computer program products, such as a transmitted waveform to be used in transmitting the information or functionality.

As one or ordinary skill in the art will readily appreciate, temperature set and control apparatus fabricated in accordance with one or more embodiments of the present invention may include any number of fluid seals, gaskets, adhesives, washers, or other elements that function to seal the assembly and to prevent thermal transfer fluid from leaking (internally or externally).

Embodiments have been described above which comprise a fluidic switch, and embodiments have been described above wherein a fluidic switch comprises a valve. It should be understand that the term fluidic switch is used herein in the broadest sense of being apparatus capable of diverting or inhibiting a flow of a fluid (as set forth above, a liquid or a gas). A valve has been defined to be a device that regulates the flow of substances (either gases, fluidized solids, slurries, or liquids) by opening, closing, or partially obstructing various passageways. As such, when a valve performs such functions, it is considered herein also to be a switch. In addition, it should be understood by those of ordinary skill in the art that an intake fluidic switch may also be referred to as an entrance fluidic switch, and an exhaust fluidic switch may also be referred to as an exit fluidic switch.

The scope of the invention should be determined with reference to the appended claims along with their full scope of equivalents.

What is claimed is:

1. A temperature set and control apparatus for a device that comprises:
   a heat transfer apparatus configured to thermally contact the device, the heat transfer apparatus having an apparatus intake to receive thermal transfer fluid, an apparatus exhaust to output thermal transfer fluid, and a conduit to conduct thermal transfer fluid from the apparatus intake to the apparatus exhaust through the heat transfer apparatus;
   a first thermal control circuit configured to flow a first thermal transfer fluid therein continuously at a first temperature, and a second thermal control circuit configured to flow a second thermal transfer fluid therein continuously at a second temperature; and
   a fluid switch block fluidically connected to the first and second thermal control circuits and fluidically connectable to the heat transfer apparatus, the fluid switch block being activatable to a plurality of states wherein:
   in a first state wherein only the first thermal transfer fluid flows through the heat transfer apparatus, the fluid switch block simultaneously causes: (a) the first thermal transfer fluid continuously flowing in the first thermal control circuit to flow continuously from the first thermal control circuit into the apparatus intake, and from the apparatus exhaust continuously back into the first thermal control circuit, and (b) the second thermal transfer fluid continuously flowing in the second thermal transfer fluid to flow in the second thermal control circuit without flowing into the apparatus intake; and
   in a second state wherein only the second thermal transfer fluid flows through the heat transfer apparatus, the fluid switch block simultaneously causes: (a) the first transfer fluid continuously flowing in the first thermal control circuit to flow in the first thermal control circuit without flowing into the apparatus intake, and (b) the second transfer fluid continuously flowing in the second thermal transfer fluid to flow continuously from the second thermal control circuit into the apparatus intake, and from the apparatus exhaust continuously back into the second thermal control circuit.

2. The temperature set and control apparatus of claim 1 wherein the first and second thermal transfer fluid is the same.

3. The temperature set and control apparatus of claim 2 which further comprises a reservoir of thermal transfer fluid fluidically connected to the first and second thermal control circuits.

4. The temperature set and control apparatus of claim 3 wherein the reservoir is pressurized by introducing gas into the reservoir from a gas supply system.

5. The temperature set and control apparatus of claim 1 wherein the fluid switch block comprises:
   two pairs of intake and exhaust fluidic switches wherein:
      (a) an intake fluidic switch of a pair is fluidically connectable to the apparatus intake or an exhaust fluidic switch of the pair, and (b) the exhaust fluidic switch of the pair is fluidically connectable to the intake fluidic switch of the pair or the apparatus exhaust, the intake and exhaust fluidic switches of the pairs being activatable to a plurality of states;
   wherein:
   the first thermal control circuit is fluidically connected to the first intake fluidic switch and the first exhaust fluidic switch, and the second thermal control circuit is fluidically connected to the second intake fluidic switch and the second fluidic exhaust switch;
   in a first state: (a) the first intake fluidic switch is fluidically connected to the apparatus intake and the first exhaust fluidic switch is fluidically connected to the apparatus exhaust, and (b) the second intake fluidic switch is fluidically connected to the second exhaust fluidic switch; and
   in a second state: (a) the first intake fluidic switch is fluidically connected to the first exhaust fluidic switch, and (b) the second intake fluidic switch is fluidically connected to the apparatus intake and the second exhaust fluidic switch is fluidically connected to the apparatus exhaust.

6. The temperature set and control apparatus of claim 5 that further comprises:
   a manifold having an intake plenum fluidly connected to receive thermal transfer fluid from the first intake fluidic switch or the second intake fluidic switch and to provide such received thermal transfer fluid to the apparatus intake, and an exhaust plenum fluidly connected to receive thermal transfer fluid from the apparatus exhaust and to deliver such received thermal transfer fluid to the first intake exhaust switch or the second exhaust fluidic switch.

7. The temperature set and control apparatus of claim 1 which further comprises an activation controller configured to activate the fluid switch block to the plurality of states at predetermined times.

8. The temperature set and control apparatus of claim 7 wherein the activation controller is configured to activate the fluid switch block to alternate activation of the plurality of states to achieve a predetermined temperature of the heat apparatus between the first and second temperatures.

9. The temperature set and control apparatus of claim 1 wherein one or more of the first or the second thermal transfer fluid is a gas.

10. The thermal set and control apparatus of claim 9 wherein the gas is selected from a group including helium, helium mixtures, nitrogen, carbon dioxide, hydrogen, and mixtures thereof.

11. The temperature set and control apparatus of claim 1 wherein one or more of the first or the second thermal transfer fluid is a liquid.

12. The temperature set and control apparatus of claim 1 wherein the heat transfer apparatus is a thermal head.

13. The temperature set and control apparatus of claim 1 wherein:
   the first thermal control circuit comprises a pump to circulate the first thermal transfer fluid therein and a heat exchanger thermally coupled to a first temperature control unit to maintain the first thermal transfer fluid at the first temperature; and
   the second thermal control circuit comprises a pump to circulate the second thermal transfer fluid therein and a heat exchanger thermally coupled to a second temperature control unit to maintain the second thermal transfer fluid at the second temperature.

14. The temperature set and control apparatus of claim 1 wherein at least one of the fluidic switches comprises a valve.

15. A method for setting and controlling temperature of a device that comprises:
   thermally contacting the device to a heat transfer apparatus, the heat transfer apparatus having an apparatus intake to receive thermal transfer fluid, an apparatus exhaust to output thermal transfer fluid, and a conduit to conduct thermal transfer fluid from the apparatus intake to the apparatus exhaust through the heat transfer apparatus;
   continuously flowing a first thermal transfer fluid in a first thermal control circuit at a first temperature, and continuously flowing a second thermal transfer fluid in a second thermal control circuit at a second temperature, the first and second thermal control circuits being fluidically connected to a fluid switch block which is fluidically connectable to the heat transfer apparatus, the fluid switch block being activatable to a plurality of states; and
   activating the fluid switch block in a first state, and then in a second state wherein:
   in the first state, wherein only the first thermal transfer fluid flows through the heat transfer apparatus, the fluid switch block simultaneously causes: (a) the first thermal transfer fluid continuously flowing in the first thermal control circuit to flow continuously from the first thermal control circuit into the apparatus intake, and from the apparatus exhaust continuously back into the first thermal control circuit, and (b) the second thermal transfer fluid continuously flowing in the second thermal transfer fluid to flow in the second thermal control circuit without flowing into the apparatus intake; and
   in the second state, wherein only the second thermal transfer fluid flows through the heat transfer apparatus, the fluid switch block simultaneously causes: (a) the first transfer fluid continuously flowing in the first thermal control circuit to flow in the first thermal control circuit without flowing into the apparatus intake, and (b) the second transfer fluid continuously flowing in the second thermal transfer fluid to flow continuously from the second thermal control circuit into the apparatus intake, and from the apparatus exhaust continuously back into the second thermal control circuit.

16. The method of claim 15 wherein the first and second thermal transfer fluid is the same.

17. The method of claim 16 wherein a reservoir of thermal transfer fluid is fluidly connected to the first and second thermal control circuits.

* * * * *